US012689616B2

(12) United States Patent
Moon et al.

(10) Patent No.: US 12,689,616 B2
(45) Date of Patent: Jul. 21, 2026

(54) GEOGRAPHICAL TRACKING OF NETWORK CONTENT IN A CONTENT ORIENTED NETWORK AND SELECTIVE CONTAINMENT WITHIN GEOGRAPHICAL BOUNDARIES

(71) Applicant: WhiteStar Communications, Inc., Durham, NC (US)

(72) Inventors: Billy Gayle Moon, Farragut, TN (US); William Victor Moon, Chapel Hill, NC (US); Benjamin Henry Derosier Thomas, Chester, VA (US); Logan Andrew Miller, Chattanooga, TN (US); Marcus W. Fath, Raleigh, NC (US)

(73) Assignee: WhiteStar Communications, Inc., Durham, NC (US)

( * ) Notice: Subject to any disclaimer, the term of this patent is extended or adjusted under 35 U.S.C. 154(b) by 14 days.

(21) Appl. No.: 18/797,984

(22) Filed: Aug. 8, 2024

(65) Prior Publication Data

US 2026/0046276 A1 Feb. 12, 2026

(51) Int. Cl.
| | |
|---|---|
| *H04L 29/06* | (2006.01) |
| *H04L 9/40* | (2022.01) |
| *H04L 67/1074* | (2022.01) |
| *H04L 69/16* | (2022.01) |

(52) U.S. Cl.
CPC ...... *H04L 63/0428* (2013.01); *H04L 67/1074* (2013.01); *H04L 69/161* (2013.01)

(58) Field of Classification Search
CPC ..................... H04L 63/0428; H04L 67/1074; H04L 69/161
See application file for complete search history.

(56) References Cited

U.S. PATENT DOCUMENTS

| | | | |
|---|---|---|---|
| 8,233,388 B2 * | 7/2012 | Zheng ................... | H04L 12/66 370/230.1 |
| 8,380,700 B2 | 2/2013 | Moon et al. | |
| 8,527,457 B2 | 9/2013 | Moon et al. | |

(Continued)

OTHER PUBLICATIONS

Chen, Quanjun, Salil S. Kanhere, and Mahbub Hassan. "Performance analysis of geography-limited broadcasting in multihop wireless networks." Wireless Communications and Mobile Computing 13.15 (2013): 1406-1421. (Year: 2013).*

(Continued)

*Primary Examiner* — Ka Shan Choy

(74) *Attorney, Agent, or Firm* — Leon R. Turkevich

(57) ABSTRACT

In one embodiment, a method comprises: receiving, by a secure executable container executed by a network device, a request to initiate a secure peer-to-peer transfer of a network content item to a second network device in a secure data network; generating a root data object containing metadata describing the network content item and identifying one or more message objects containing respective data chunks of the network content item, the root data object and the data chunks constituting a hyperlinked hypercontent object; generating a secure data packet based on encrypting the root data object or one of the data chunks, the secure data packet of the root data object including a content tracking identifier; and causing a geographical tracking of at least the root data object during transfer of the secure data packet via the secure data network.

22 Claims, 11 Drawing Sheets

(56)     References Cited

U.S. PATENT DOCUMENTS

|  |  |  |  |  |
|---|---|---|---|---|
| 8,612,279 | B2 | 12/2013 | Moon et al. | |
| 11,582,201 | B1 | 2/2023 | Moon | |
| 11,792,186 | B2 | 10/2023 | Moon | |
| 11,924,177 | B2 | 3/2024 | Moon | |
| 12,010,245 | B2 | 6/2024 | Moon | |
| 12,052,266 | B2 | 7/2024 | Moon | |
| 12,058,243 | B2 | 8/2024 | Moon | |
| 12,271,451 | B2 * | 4/2025 | Sarkissian | G06F 21/16 |
| 2012/0150945 | A1 * | 6/2012 | Tcha | H04L 67/1074 |
| | | | | 709/203 |
| 2020/0344211 | A1 * | 10/2020 | Katz | H04L 63/0236 |
| 2022/0417252 | A1 | 12/2022 | Moon et al. | |
| 2023/0012373 | A1 | 1/2023 | Moon | |
| 2023/0164121 | A1 | 5/2023 | Moon | |

OTHER PUBLICATIONS

"The most advanced Time Series platform", 2024, [online], [retrieved on Jul. 29, 2024]. Retrieved from the Internet: URL: <https://www.warp10.io/>, 10 pages.

* cited by examiner

| Sentinel Content Sensor | Content Tracking Sensor Recording |
|---|---|
| io.whiteStar.content.created | When content created: Time, Location, ContentTrackingUUID, Source FederationID, FileName, FileType, FileSize, ContentRating, SourceEndpointID, TotalChunks -> value is 0 |
| io.whiteStar.content.L3Relay<br>io.whiteStar.content.L5Relay | When a content root chunk is relayed: SourceEndpointID, SourceFederationID, DestinationEndpointID, DestinationFederationID, ReplicatorEndpointID, ContentTrackingUUID -> value is 0 |
| io.whiteStar.content.origin | When content is sent: Time, Location, ContentTrackingUUID, Source FederationID, FileName, FileType, FileSize, ContentRating, SourceEndpointID, TotalChunks -> value is 0 |
| io.whiteStar.content.destination | When content is received: Time, Location, ContentTrackingUUID, Source FederationID, FileName, FileType, FileSize, ContentRating, SourceEndpointID, TotalChunks, TransferTarget -> value is 0 |
| io.whiteStar.content.changed | When content changed: Time, Location, ContentTrackingUUID, Source FederationID, FileName, FileType, FileSize, ContentRating, SourceEndpointID, TotalChunks -> value is 0 |
| io.whiteStar.content.deleted | When content deleted: Time, Location, ContentTrackingUUID, Source FederationID, FileName, FileType, FileSize, ContentRating, SourceEndpointID, TotalChunks -> value is 0 |
| io.whiteStar.content.viewed | When content viewed: Time, Location, ContentTrackingUUID, Source FederationID, FileName, FileType, FileSize, ContentRating, SourceEndpointID, TotalChunks -> value is 0 |

| DEVICE INTERFACE CIRCUIT | 90 |
| PROCESSOR CIRCUIT (E.G., MICROPROCESSOR CIR., MULTI-PROCESSOR CORE CIR., ASIC, ETC.) | 92 |
| MEMORY CIRCUIT | 94 |

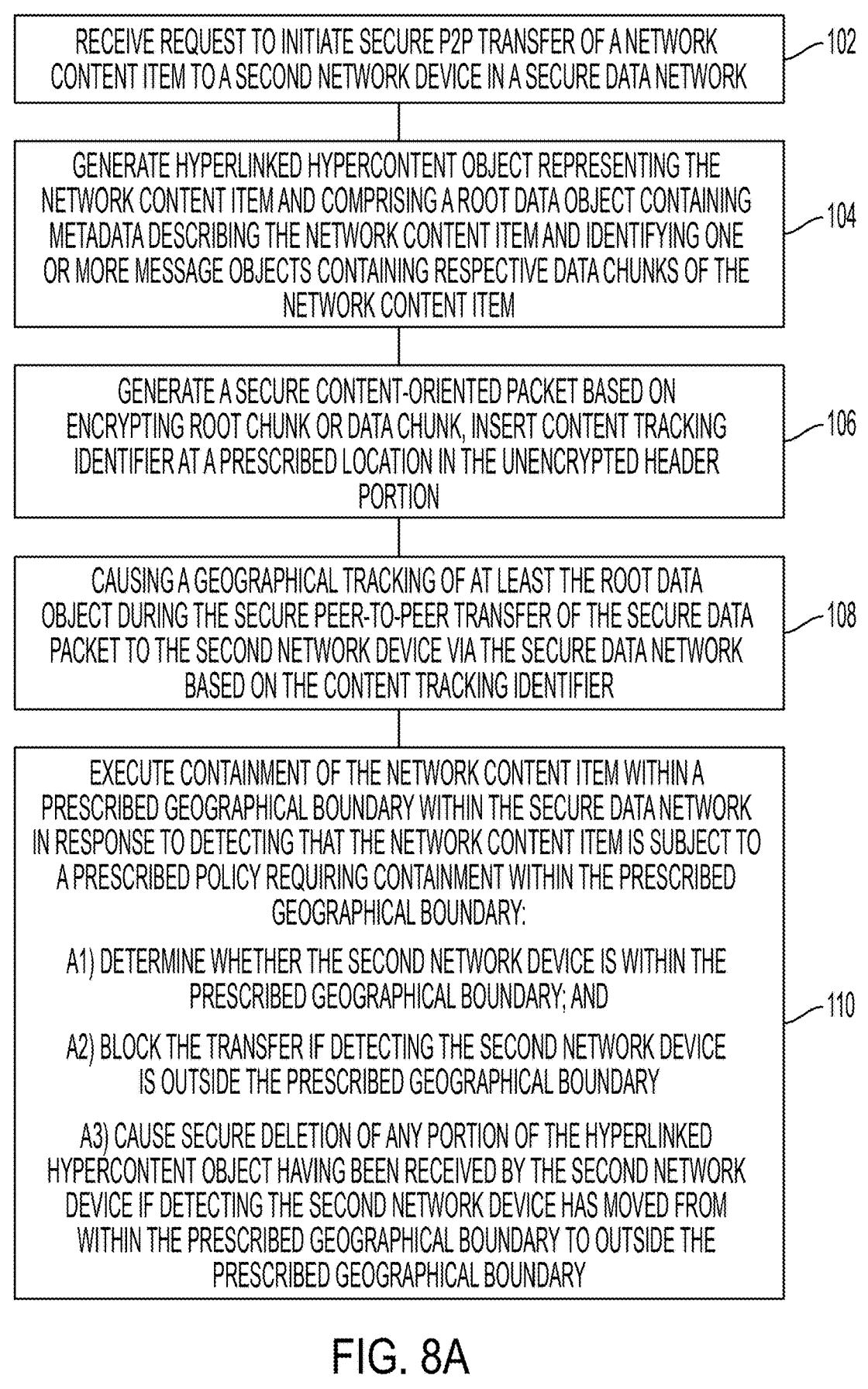

RECEIVE REQUEST TO INITIATE SECURE P2P TRANSFER OF A NETWORK CONTENT ITEM TO A SECOND NETWORK DEVICE IN A SECURE DATA NETWORK —102

GENERATE HYPERLINKED HYPERCONTENT OBJECT REPRESENTING THE NETWORK CONTENT ITEM AND COMPRISING A ROOT DATA OBJECT CONTAINING METADATA DESCRIBING THE NETWORK CONTENT ITEM AND IDENTIFYING ONE OR MORE MESSAGE OBJECTS CONTAINING RESPECTIVE DATA CHUNKS OF THE NETWORK CONTENT ITEM —104

GENERATE A SECURE CONTENT-ORIENTED PACKET BASED ON ENCRYPTING ROOT CHUNK OR DATA CHUNK, INSERT CONTENT TRACKING IDENTIFIER AT A PRESCRIBED LOCATION IN THE UNENCRYPTED HEADER PORTION —106

CAUSING A GEOGRAPHICAL TRACKING OF AT LEAST THE ROOT DATA OBJECT DURING THE SECURE PEER-TO-PEER TRANSFER OF THE SECURE DATA PACKET TO THE SECOND NETWORK DEVICE VIA THE SECURE DATA NETWORK BASED ON THE CONTENT TRACKING IDENTIFIER —108

EXECUTE CONTAINMENT OF THE NETWORK CONTENT ITEM WITHIN A PRESCRIBED GEOGRAPHICAL BOUNDARY WITHIN THE SECURE DATA NETWORK IN RESPONSE TO DETECTING THAT THE NETWORK CONTENT ITEM IS SUBJECT TO A PRESCRIBED POLICY REQUIRING CONTAINMENT WITHIN THE PRESCRIBED GEOGRAPHICAL BOUNDARY:

A1) DETERMINE WHETHER THE SECOND NETWORK DEVICE IS WITHIN THE PRESCRIBED GEOGRAPHICAL BOUNDARY; AND

A2) BLOCK THE TRANSFER IF DETECTING THE SECOND NETWORK DEVICE IS OUTSIDE THE PRESCRIBED GEOGRAPHICAL BOUNDARY

A3) CAUSE SECURE DELETION OF ANY PORTION OF THE HYPERLINKED HYPERCONTENT OBJECT HAVING BEEN RECEIVED BY THE SECOND NETWORK DEVICE IF DETECTING THE SECOND NETWORK DEVICE HAS MOVED FROM WITHIN THE PRESCRIBED GEOGRAPHICAL BOUNDARY TO OUTSIDE THE PRESCRIBED GEOGRAPHICAL BOUNDARY —110

FIG. 8A

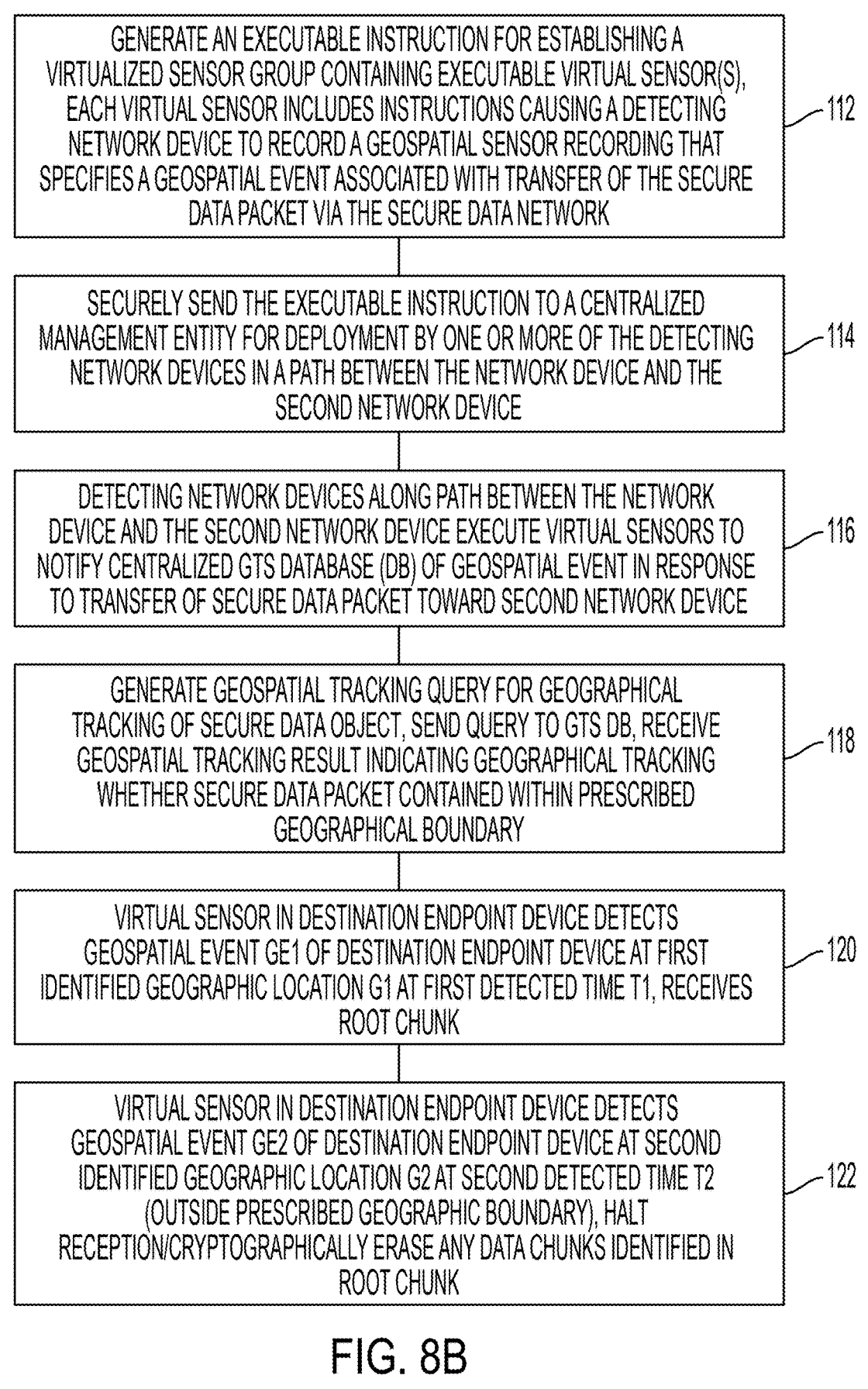

GENERATE AN EXECUTABLE INSTRUCTION FOR ESTABLISHING A VIRTUALIZED SENSOR GROUP CONTAINING EXECUTABLE VIRTUAL SENSOR(S), EACH VIRTUAL SENSOR INCLUDES INSTRUCTIONS CAUSING A DETECTING NETWORK DEVICE TO RECORD A GEOSPATIAL SENSOR RECORDING THAT SPECIFIES A GEOSPATIAL EVENT ASSOCIATED WITH TRANSFER OF THE SECURE DATA PACKET VIA THE SECURE DATA NETWORK — 112

SECURELY SEND THE EXECUTABLE INSTRUCTION TO A CENTRALIZED MANAGEMENT ENTITY FOR DEPLOYMENT BY ONE OR MORE OF THE DETECTING NETWORK DEVICES IN A PATH BETWEEN THE NETWORK DEVICE AND THE SECOND NETWORK DEVICE — 114

DETECTING NETWORK DEVICES ALONG PATH BETWEEN THE NETWORK DEVICE AND THE SECOND NETWORK DEVICE EXECUTE VIRTUAL SENSORS TO NOTIFY CENTRALIZED GTS DATABASE (DB) OF GEOSPATIAL EVENT IN RESPONSE TO TRANSFER OF SECURE DATA PACKET TOWARD SECOND NETWORK DEVICE — 116

GENERATE GEOSPATIAL TRACKING QUERY FOR GEOGRAPHICAL TRACKING OF SECURE DATA OBJECT, SEND QUERY TO GTS DB, RECEIVE GEOSPATIAL TRACKING RESULT INDICATING GEOGRAPHICAL TRACKING WHETHER SECURE DATA PACKET CONTAINED WITHIN PRESCRIBED GEOGRAPHICAL BOUNDARY — 118

VIRTUAL SENSOR IN DESTINATION ENDPOINT DEVICE DETECTS GEOSPATIAL EVENT GE1 OF DESTINATION ENDPOINT DEVICE AT FIRST IDENTIFIED GEOGRAPHIC LOCATION G1 AT FIRST DETECTED TIME T1, RECEIVES ROOT CHUNK — 120

VIRTUAL SENSOR IN DESTINATION ENDPOINT DEVICE DETECTS GEOSPATIAL EVENT GE2 OF DESTINATION ENDPOINT DEVICE AT SECOND IDENTIFIED GEOGRAPHIC LOCATION G2 AT SECOND DETECTED TIME T2 (OUTSIDE PRESCRIBED GEOGRAPHIC BOUNDARY), HALT RECEPTION/CRYPTOGRAPHICALLY ERASE ANY DATA CHUNKS IDENTIFIED IN ROOT CHUNK — 122

FIG. 8B

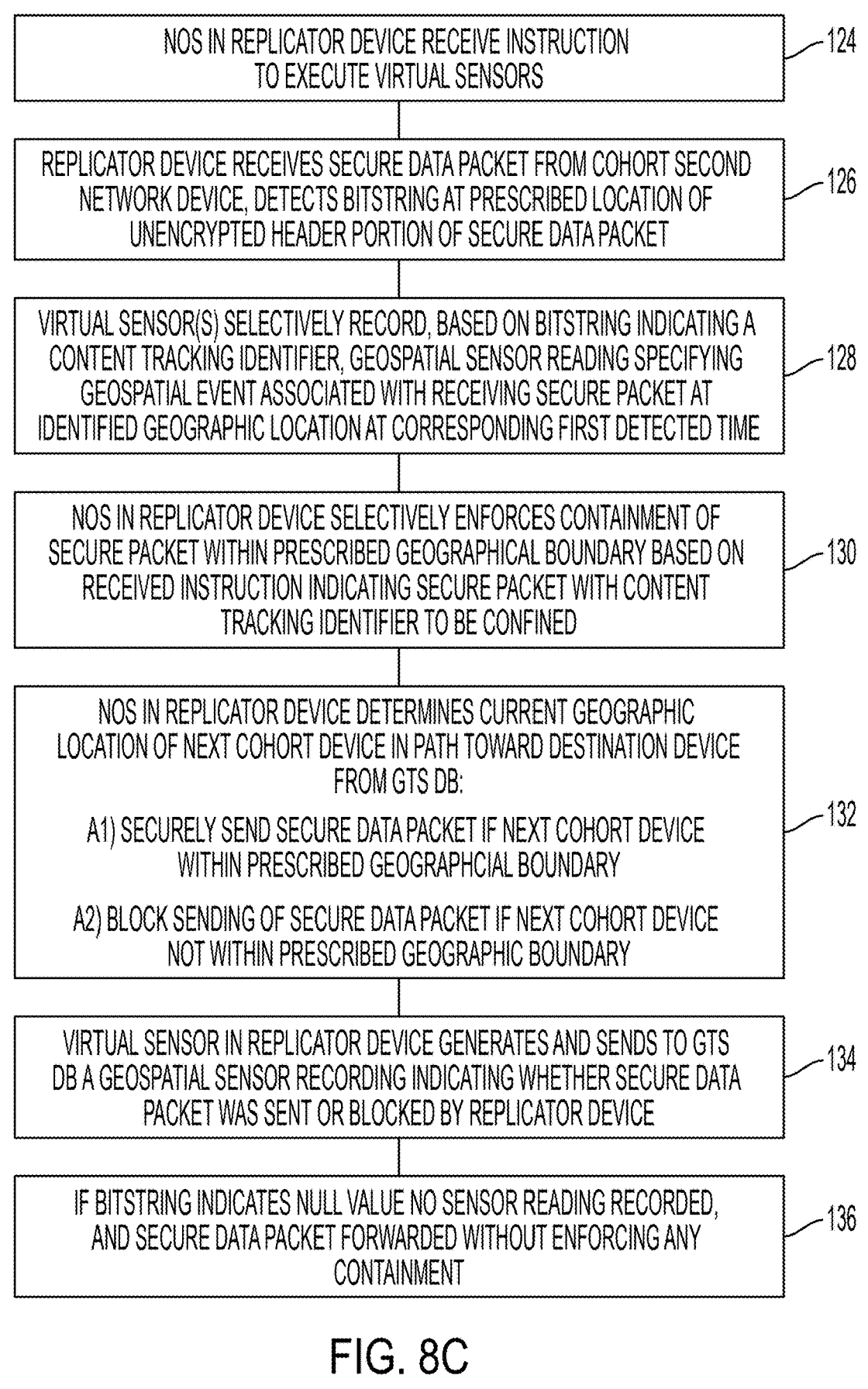

NOS IN REPLICATOR DEVICE RECEIVE INSTRUCTION TO EXECUTE VIRTUAL SENSORS — 124

REPLICATOR DEVICE RECEIVES SECURE DATA PACKET FROM COHORT SECOND NETWORK DEVICE, DETECTS BITSTRING AT PRESCRIBED LOCATION OF UNENCRYPTED HEADER PORTION OF SECURE DATA PACKET — 126

VIRTUAL SENSOR(S) SELECTIVELY RECORD, BASED ON BITSTRING INDICATING A CONTENT TRACKING IDENTIFIER, GEOSPATIAL SENSOR READING SPECIFYING GEOSPATIAL EVENT ASSOCIATED WITH RECEIVING SECURE PACKET AT IDENTIFIED GEOGRAPHIC LOCATION AT CORRESPONDING FIRST DETECTED TIME — 128

NOS IN REPLICATOR DEVICE SELECTIVELY ENFORCES CONTAINMENT OF SECURE PACKET WITHIN PRESCRIBED GEOGRAPHICAL BOUNDARY BASED ON RECEIVED INSTRUCTION INDICATING SECURE PACKET WITH CONTENT TRACKING IDENTIFIER TO BE CONFINED — 130

NOS IN REPLICATOR DEVICE DETERMINES CURRENT GEOGRAPHIC LOCATION OF NEXT COHORT DEVICE IN PATH TOWARD DESTINATION DEVICE FROM GTS DB:

A1) SECURELY SEND SECURE DATA PACKET IF NEXT COHORT DEVICE WITHIN PRESCRIBED GEOGRAPHCIAL BOUNDARY

A2) BLOCK SENDING OF SECURE DATA PACKET IF NEXT COHORT DEVICE NOT WITHIN PRESCRIBED GEOGRAPHIC BOUNDARY — 132

VIRTUAL SENSOR IN REPLICATOR DEVICE GENERATES AND SENDS TO GTS DB A GEOSPATIAL SENSOR RECORDING INDICATING WHETHER SECURE DATA PACKET WAS SENT OR BLOCKED BY REPLICATOR DEVICE — 134

IF BITSTRING INDICATES NULL VALUE NO SENSOR READING RECORDED, AND SECURE DATA PACKET FORWARDED WITHOUT ENFORCING ANY CONTAINMENT — 136

FIG. 8C

GEOGRAPHICAL TRACKING OF NETWORK CONTENT IN A CONTENT ORIENTED NETWORK AND SELECTIVE CONTAINMENT WITHIN GEOGRAPHICAL BOUNDARIES

TECHNICAL FIELD

The present disclosure generally relates to geographical tracking of network content in a content oriented network and selective containment within geographical boundaries.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A content oriented network is a data network configured to route and store network content based on having a capability to understand attributes about the network content. Example network content can include a media content file (e.g., an audio and/or video file, an image file, or a combination thereof), a text-based file, and/or any other data file containing metadata describing another data file. The network content can be generated by a user-controlled input device and/or by an Internet of Things (IOT) device without user control.

Existing Internet Protocol (IP) data networks such a private local area network (LAN), a private wide area network (WAN) or public WAN such as the Internet are not capable of interpreting network content because the network content (also referred to herein as a "network content item") is invariably divided into one or more opaque (i.e., unreadable) payload portions having a size of up to about 1500 bytes in corresponding one or more IP data packets that are routed based on a source IP address and a destination IP address specified in the IP data packet. In case that the network content has a size exceeding 1500 bytes, the network content can be divided into two or more opaque payload portions that are transmitted in two or more respective IP data packets; in case that the network content has a size less than 1500 bytes, the opaque payload portion of the IP data packet may include the network content and at least a portion of another network content item in order to "fill" the opaque payload portion to the capacity size of about 1500 bytes. Hence, a stream of "M" network content items can be divided as opaque portions among "N" IP data packets, with no correlation between the number "M" of network content items and the number "N" of IP data packets transmitting the "M" network content items as opaque payload.

Hence, the inability of IP data networks to interpret network content results in existing layer 2/layer 3 switches deployed in the Internet being unaware of network content, and thus incapable of identifying or distinguishing content transmitted by layer 2/layer 3 data packets implemented using IP packets. Although a level 7 switch could identify a type of content based on aggregating and reassembling payload portions from multiple IP data packets to recover a transmitted network content item, such as a level 7 switch typically is deployed only within a demilitarized zone (DMZ) alongside a firewall. Hence, a level 7 switch would be unaware of IP data packets transmitted within a private wide area network that covers multiple geographical boundaries. In addition, existing tracing tools such as NetFlow is only aware of IP data packets, not the opaque payload within the IP data packets.

Consequently, an inability to track the opaque payload of layer 2/layer 3 data packets renders existing IP data networks such as the Internet incapable of identifying network content and incapable of geographically tracking the network content transmitted through the existing IP data networks. Hence, existing IP-based wide area networks such as multinational data centers may be incapable of enforcing any containment of network content within geographical boundaries as may be required by export control laws or privacy laws such as the General Data Protection Regulation (GDPR) promulgated by the European Union (EU).

BRIEF DESCRIPTION OF THE DRAWINGS

Reference is made to the attached drawings, wherein elements having the same reference numeral designations represent like elements throughout and wherein:

FIGS. 5A and 5B illustrate example virtual sensors and respective example sensor recordings recorded by the virtual sensors, according to an example embodiment.

FIGS. 8A-8C illustrate example operations executed by any one or more of the network devices in FIG. 1 in executing geographical tracking of network content and selective containment within geographical boundaries, according to an example embodiment.

DESCRIPTION OF EXAMPLE EMBODIMENTS

Overview

Figure 1:
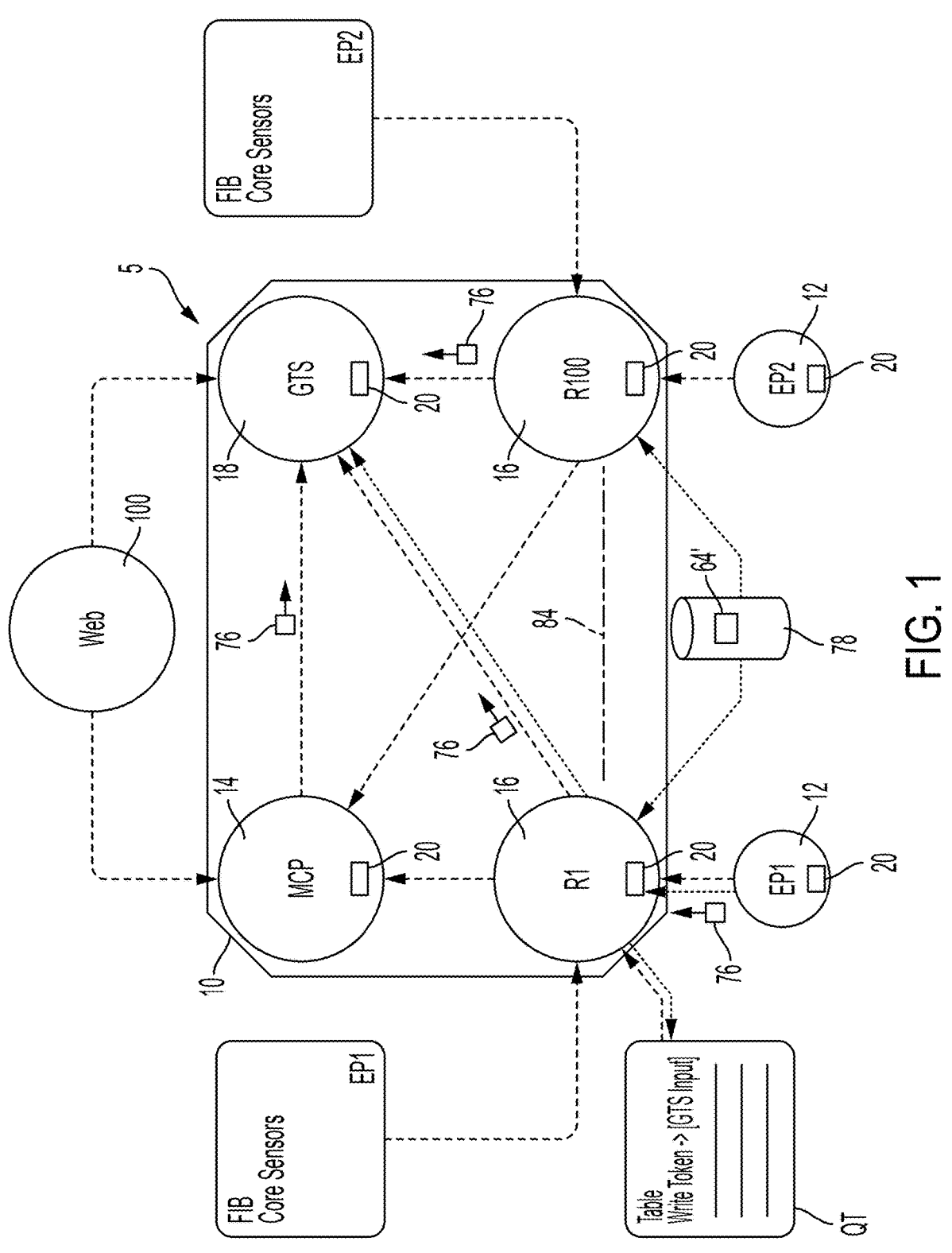
FIG. 1 illustrates an example secure peer-to-peer data network having an apparatus for causing geographical tracking and selective containment within geographical boundaries of network content, according to an example embodiment.

In one embodiment, a method comprises receiving, by a secure executable container executed by a network device, a request to initiate a secure peer-to-peer transfer of a network content item to at least a second network device in a secure data network, the second network device a cohort having established a two-way trusted relationship with the network device; generating, by the secure executable container, a root data object containing metadata describing the network content item and comprising a list identifying one or more message objects containing respective data chunks of the network content item, the root data object and the data chunks constituting a hyperlinked hypercontent object representing the network content item; generating, by the secure executable container, a secure data packet based on encrypting the root data object or one of the data chunks of the data object, the secure data packet of the root data object including a content tracking identifier at a prescribed location in the unencrypted header portion; and causing, by the secure executable container based on the content tracking identifier, a geographical tracking of at least the root data object during the secure peer-to-peer transfer of the secure data packet to the second network device via the secure data network.

In another embodiment, one or more non-transitory tangible media are encoded with logic for execution by a machine and when executed by the machine operable for: receiving, by the or more non-transitory tangible media executed by the machine implemented as a network device, a request to initiate a secure peer-to-peer transfer of a network content item to at least a second network device in a secure data network, the one or more non-transitory tangible media implemented as a secure executable container; generating, by the secure executable container, a root data object containing metadata describing the network content item and comprising a list identifying one or more message objects containing respective data chunks of the network content item, the root data object and the data chunks constituting a hyperlinked hypercontent object representing the network content item; generating, by the secure executable container, a secure data packet based on encrypting the root data object or one of the data chunks of the data object, the secure data packet of the root data object including a content tracking identifier at a prescribed location in the unencrypted header portion; and causing, by the secure executable container based on the content tracking identifier, a geographical tracking of at least the root data object during the secure peer-to-peer transfer of the secure data packet to the second network device via the secure data network.

In another embodiment, an apparatus is implemented as a physical machine, the apparatus comprising: non-transitory machine readable media configured for storing executable machine readable code implemented as a secure executable container; a device interface circuit; and a processor circuit configured for executing the machine readable code as a network device, and when executing the machine readable code operable for: receiving a request to initiate a secure peer-to-peer transfer of a network content item to at least a second network device in a secure data network, the second network device a cohort having established a two-way trusted relationship with the network device; generating a root data object containing metadata describing the network content item and comprising a list identifying one or more message objects containing respective data chunks of the network content item, the root data object and the data chunks constituting a hyperlinked hypercontent object representing the network content item; generating a secure data packet based on encrypting the root data object or one of the data chunks of the data object, the secure data packet of the root data object including a content tracking identifier at a prescribed location in the unencrypted header portion; causing, based on the content tracking identifier, a geographical tracking of at least the root data object during the secure peer-to-peer transfer of the secure data packet to the second network device via the secure data network.

In another embodiment, a method comprises: receiving, by a secure executable container executed by a replicator device in a secure data network, an instruction to execute one or more virtual sensors of a virtualized sensor group; receiving, by the secure executable container, a secure data packet from a second network device, the second network device a cohort having established a two-way trusted relationship with the replicator device in the secure data network; detecting, by the secure executable container, a bitstring at a prescribed location in an unencrypted header portion of the secure data packet; selectively recording, by the one or more virtual sensors executed by the replicator device in response to the instruction and detection of the bitstring as indicating a content tracking identifier, a sensor recording that specifies a geospatial event associated with reception of the secure data packet at an identified geographic location of the replicator device at a corresponding first detected time; and selectively enforcing, by the secure executable container in response to detection of the bitstring as indicating the content tracking identifier, a containment of the secure data packet within a prescribed geographical boundary based on a received instruction indicating the secure data packet associated with the content tracking identifier is to be confined within the prescribed geographical boundary.

In another embodiment, one or more non-transitory tangible media are encoded with logic for execution by a machine and when executed by the machine operable for: receiving, by the or more non-transitory tangible media executed by the machine implemented as a replicator device in a secure data network, an instruction to execute one or more virtual sensors of a virtualized sensor group, the one or more non-transitory tangible media implemented as a secure executable container; receiving, by the secure executable container, a secure data packet from a second network device, the second network device a cohort having established a two-way trusted relationship with the replicator device in the secure data network; detecting, by the secure executable container, a bitstring at a prescribed location in an unencrypted header portion of the secure data packet; selectively recording, by the one or more virtual sensors executed by the replicator device in response to the instruction and detection of the bitstring as indicating a content tracking identifier, a sensor recording that specifies a geospatial event associated with reception of the secure data packet at an identified geographic location of the replicator device at a corresponding first detected time; and selectively enforcing, by the secure executable container in response to detection of the bitstring as indicating the content tracking identifier, a containment of the secure data packet within a prescribed geographical boundary based on a received instruction indicating the secure data packet associated with the content tracking identifier is to be confined within the prescribed geographical boundary.

In another embodiment, an apparatus is implemented as a physical machine, the apparatus comprising: non-transitory machine readable media configured for storing executable machine readable code implemented as a secure executable container; a device interface circuit; and a processor circuit configured for executing the machine readable code as a replicator device in a secure data network, and when executing the machine readable code operable for: receiving an instruction to execute one or more virtual sensors of a virtualized sensor group; receiving a secure data packet from a second network device, the second network device a cohort having established a two-way trusted relationship with the replicator device in the secure data network; detecting a bitstring at a prescribed location in an unencrypted header portion of the secure data packet; selectively recording, by the one or more virtual sensors executed by the replicator device in response to the instruction and detection of the bitstring as indicating a content tracking identifier, a sensor recording that specifies a geospatial event associated with reception of the secure data packet at an identified geographic location of the replicator device at a corresponding first detected time; and selectively enforcing, in response to detection of the bitstring as indicating the content tracking identifier, a containment of the secure data packet within a prescribed geographical boundary based on a received instruction indicating the secure data packet associated with the content tracking identifier is to be confined within the prescribed geographical boundary.

DETAILED DESCRIPTION

Particular embodiments can provide full geographical content traceability of a network content item that is inserted into and propagated through a secure data network. The particular embodiments can detect a reception of a network content item at a source network device, where the source network device includes a secure executable container that provides a secure interface to the secure data network. The secure executable container can receive a request to initiate a secure storage and/or secure peer-to-peer transfer of the network content item, and in response can generate a hyperlinked hypercontent object comprising a root data object and zero or more message objects containing respective data chunks of the network content item. The root data object contains metadata describing the network content item and further identifying each of the message objects; hence, the secure executable container can securely store and/or execute secure peer-to-peer transfer of the network content item based on secure storage and/or secure transfer of the root data object and the message objects that collectively represent the network content item. The secure executable container in the source network device or a destination network device also can reassemble or reconstitute the network content item based on the root data object and the message objects.

The secure executable container executed in the source network device can provide the full content traceability based on generating a secure content-oriented packet (also referred to herein as a "secure data packet") that includes an unencrypted header and an encrypted payload, where the unencrypted header at a prescribed location can include a bitstring representing a content tracking identifier allocated to the hyperlinked hypercontent object. The encrypted payload can include an encrypted version of one or more "chunks" (also referred to herein as "an encrypted chunk"), where a "chunk" refers to a single root data object (also referred to herein as a "root chunk") or a single message data object referenced in the root chunk (the message data object also is referred to herein as a "message chunk"). In other words, a "chunk" can refer to a root chunk or a message chunk, and an "encrypted chunk" can refer to an encrypted root chunk or an encrypted message chunk.

Hence, the secure content-oriented packet can include an encrypted chunk and an unencrypted header that can include a source endpoint identifier, a destination endpoint identifier, a content tracking identifier, an optional priority, and an optional flow identifier. Hence, the secure data network can identify that the secure content-oriented packet is to be tracked based on one or more of the attributes specified in the unencrypted header.

Geospatial-based virtual sensors (also referred to herein as "virtual sensors") can be executed in a distributed manner by network devices in the secure data network, enabling distributed geospatial tracking of a secure content-oriented packet during transfer via the secure data network to a destination device. The distributed tracking can include the virtual sensors recording a geospatial sensor recording specifying a geospatial event: the geospatial event can include any one or more of detecting a geographical location of a network device at an identified time, detecting the network device has moved outside a prescribed geographical boundary at an identified time, or detecting the network device has moved from outside to within a prescribed geographical boundary at an identified time. The geospatial event also can include: the network device receiving a request at an identified request time to initiate a secure peer-to-peer transfer of a network content item via the secure data network; the network device receiving an identified secure content-oriented packet at an identified reception time; the network device securely initiating transfer of an identified secure content-oriented packet at an identified transfer time to another network device in the secure data network. The geospatial event also can include the geographical location of the network device during the identified reception time and/or identified transfer time.

Each geospatial sensor recording generated by a virtual sensor executed in a network device can be securely sent to a centralized geospatial time sequence (GTS) database in the secure data network. Hence, the centralized geospatial time sequence database can respond to a geospatial query from a network device in the secure data network and provide a geographical tracking of a hyperlinked hypercontent object representing a network content item (including a geographical tracking of each secure content-oriented packet containing an encrypted chunk).

The example embodiments also can cause network devices in the secure data network to selectively enforce geospatial policies that require, for example, containment of identifiable network content within a prescribed geographical boundary, for example based on an instruction according to a prescribed policy indicating a secure content-oriented packet associated with the content tracking identifier is required to be confined or contained within the prescribed geographical boundary. The instruction can be supplied, for example, by a network device in the secure data network to a centralized management entity for deployment by one or more detecting network devices in a path between a network device (e.g., a source network device) and a second network device such as a destination network device or an intermediate network device.

Hence, the example embodiments can cause geographical tracking of network content in a distributed manner as the network content is inserted into the secure data network, and propagated through the secure data network as encrypted chunks of a hyperlinked hypercontent object.

The example embodiments also can cause a network device to selectively enforce a containment of each chunk or encrypted chunk of a hyperlinked hypercontent item (representing the network content item) to within a prescribed geographical boundary: in case that the network device is outside the prescribed geographical boundary, the network device can halt reception of a secure content-oriented packet containing an encrypted data chunk not permitted outside the prescribed geographical boundary, or cryptographically erase a received content-oriented packet containing an encrypted data chunk not permitted outside the prescribed geographical boundary. In case that the network device is inside the prescribed geographical boundary, the network device can halt (or queue) transmission of the content-oriented packet until a next-hop network device in the path to a destination network device has moved back inside the prescribed geographical boundary; in case the destination network device is inside the prescribed geographical boundary but a next-hop network device has moved outside the prescribed geographical boundary, the network device may attempt to reroute transmission of the content-oriented packet to remain within the prescribed geographical boundary.

A virtual sensor can be executed in a network device and can be configured to record one or more geospatial sensor recordings at each event associated with a secure content-oriented packet (e.g., blocking reception, receiving, cryptographically erasing, queuing for transmission, attempting rerouting, transmission), and send the one or more geospatial sensor recordings to the centralized geospatial time sequence database.

FIG. 1 illustrates an example secure peer-to-peer data network 5 comprising an example secure private core network 10, according to an example embodiment. The example secure peer-to-peer data network 5, also referred to herein as "a secure data network" 5, also comprises an apparatus 12 configured for causing geographical tracking and selective containment within geographical boundaries of network content. The apparatus 12 also is referred to herein as an "endpoint device" (EP) that is configured to execute a secure executable container 20, also referred to herein as a "network operating system" or a "secure interface", described in further detail below.

The term "configured for" or "configured to" as used herein with respect to a specified operation refers to a device and/or machine that is physically constructed and arranged to perform the specified operation.

The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IOT) devices, etc.

The secure private core network 10 can comprise a centralized master control program (MCP) device 14, one or more replicator devices (e.g., "R1") 16 and a centralized geospatial time sequence (GTS) database device 18. Other network devices (e.g., community server, directory server, etc. also may deployed within the secure private core network 10. Each and every network device 12, 14, 16, and 18 in the secure data network 5 comprises the network operating system 20.

The network operating system 20, implemented within every network device 12, 14, 16, and 18 in the secure data network 5, provides exclusive access to the secure peer-to-peer data network 5; in other words, the network operating system 20 prevents any executable resource in the corresponding network device 12, 14, 16, or 18 from accessing any unencrypted form of any "at-rest" or "in-flight" secure data structures, or accessing the secure peer-to-peer data network, without authorized access via a prescribed Application Programming Interface (API) executed within and required by the network operating system 20. Moreover, the network operating system 20 executed in each and every network device 12, 14, 16, and 18 establishes an identity management system that requires a user to verify their identity upon initial registration in the secure peer-to-peer data network 5, and requires the user to establish a two-way trusted relationship with their endpoint device and any other network entity in the secure peer-to-peer data network 5.

Additional details regarding the identity management system and establishment of two-way trusted relationships between two network entities as "cohorts" (including between two cohort network devices) are disclosed in commonly-assigned, application Ser. No. 17/343,268, filed Jun. 9, 2021, issued Aug. 6, 2024 as U.S. Pat. No. 12,058,243 and entitled "IDENTITY MANAGEMENT SYSTEM ESTABLISHING TWO-WAY TRUSTED RELATIONSHIPS IN A SECURE PEER-TO-PEER DATA NETWORK", the disclosure of which is incorporated in its entirety herein by reference.

As described in the above-incorporated U.S. Pat. No. 12,058,243, each network device 12, 14, 16, and 18 in the secure data network 5 can uniquely and securely identify itself based on its network operating system 20 cryptographically generating a secure private key and a corresponding secure public key. Hence, data storage in each and every network device in the secure peer-to-peer data network 5, as well as all network communications between each and every network device, can be secured based on the network operating systems 20 executed in endpoint devices having shared secure public keys and having established a two-way trusted relationship based on a secure verification according to a prescribed secure salutation protocol. Additional details regarding exchanging device identity containers ("signets") to establish two-way trusted relationships between network devices is described in commonly-assigned, application Ser. No. 17/477,208, filed Sep. 16, 2021, issued Feb. 14, 2023 as U.S. Pat. No. 11,582,201 and entitled "ESTABLISHING AND MAINTAINING TRUSTED RELATIONSHIP BETWEEN SECURE NETWORK DEVICES IN SECURE PEER-TO-PEER DATA NETWORK BASED ON OBTAINING SECURE DEVICE IDENTITY CONTAINERS", and application Ser. No. 17/522,735, filed Nov. 9, 2021, Issued Jun. 11, 2024 as U.S. Pat. No. 12,010,245 and entitled "SECURE ASSISTANCE FOR ASYNCHRONOUS TASK COMPLETION BY UNAVAILABLE ENDPOINT DEVICE UPON RESTORED AVAILABILITY IN A SECURE PEER-TO-PEER DATA NETWORK", the disclosures of which are incorporated in its entirety herein by reference.

The network operating system 20 also can cause each replicator device 16 to establish a two-way trusted relationship with every other replicator device 16, forming a pairwise topology (e.g., a "mesh") 84 of interconnected replicator devices 16; the network operating system 20 also can cause each replicator device 16 establish a two-way trusted relationship with the MCP device 14.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Hence, each replicator device 16 can provide a connection to zero or more endpoint devices 12 for reaching the MCP device 14 and/or another endpoint device 12, described in further detail in the above-incorporated U.S. Pat. Nos. 11,582,201 and 12,058,243. Additional details regarding the secure communications in the secure data network 5 via the replicator devices 16 are described in commonly-assigned, application Ser. No. 17/345,057, filed Jun. 11, 2021, issued Mar. 5, 2024 as U.S. Pat. No. 11,924,177 and entitled "CRYPTO-SIGNED SWITCHING BETWEEN TWO-WAY TRUSTED NETWORK DEVICES IN A SECURE PEER-TO-PEER DATA NETWORK", the disclosure of which is incorporated in its entirety herein by reference.

The endpoint devices "EP1" and "EP2" 12 can exchange a secure-peer-to-peer transfer of secure content-oriented packets either via the core network 10, or without the aid of the core network 10 (hence the name hybrid peer to peer network) based on the endpoint devices "EP1" and "EP2" 12 establishing a peer to peer link layer connection, or based on the endpoint devices "EP1" and "EP2" establishing a network layer connection via a public wide area network (WAN) 100 such as the Internet, based on transmitting the secure data packet via a data packet at a TCP/IP or LTP (link lighter transport protocol) at the Layer 4 transport layer, described below. TCP and LTP are commonly known protocols defined by the Internet Engineering Task Force (IETF). A network device in the WAN 100 (e.g., a layer 3 switch 78) is not part of the secure data network 5 because the layer 3 switch 78 in the WAN does not execute the network operating system 20 that is required to establish secure communications via two-way trusted relationships within the secure data network 5.

Hence, endpoint devices 12 can simultaneously communicate either exclusively with each other, peer to peer, with some devices peer to peer and other devices via the core network 10 or with all other devices 12 via the core network 10. The endpoint devices "EP1" and "EP2" 12 can execute a secure-peer-to-peer transfer of secure content-oriented packets via an example secure file transfer enforced by the network operating system 20, or based on an example secure conversation such as a secure chat established between the endpoint devices "EP1" and "EP2" 12, described in further detail in commonly-assigned, application Ser. No. 17/388,162, filed Jul. 29, 2021, issued Oct. 17, 2023 as U.S. Pat. No. 11,792,186 and entitled "SECURE PEER-TO-PEER BASED COMMUNICATION SESSIONS VIA NETWORK OPERATING SYSTEM IN SECURE DATA NETWORK", the disclosure of which is incorporated in its entirety herein by reference.

Figure 2:
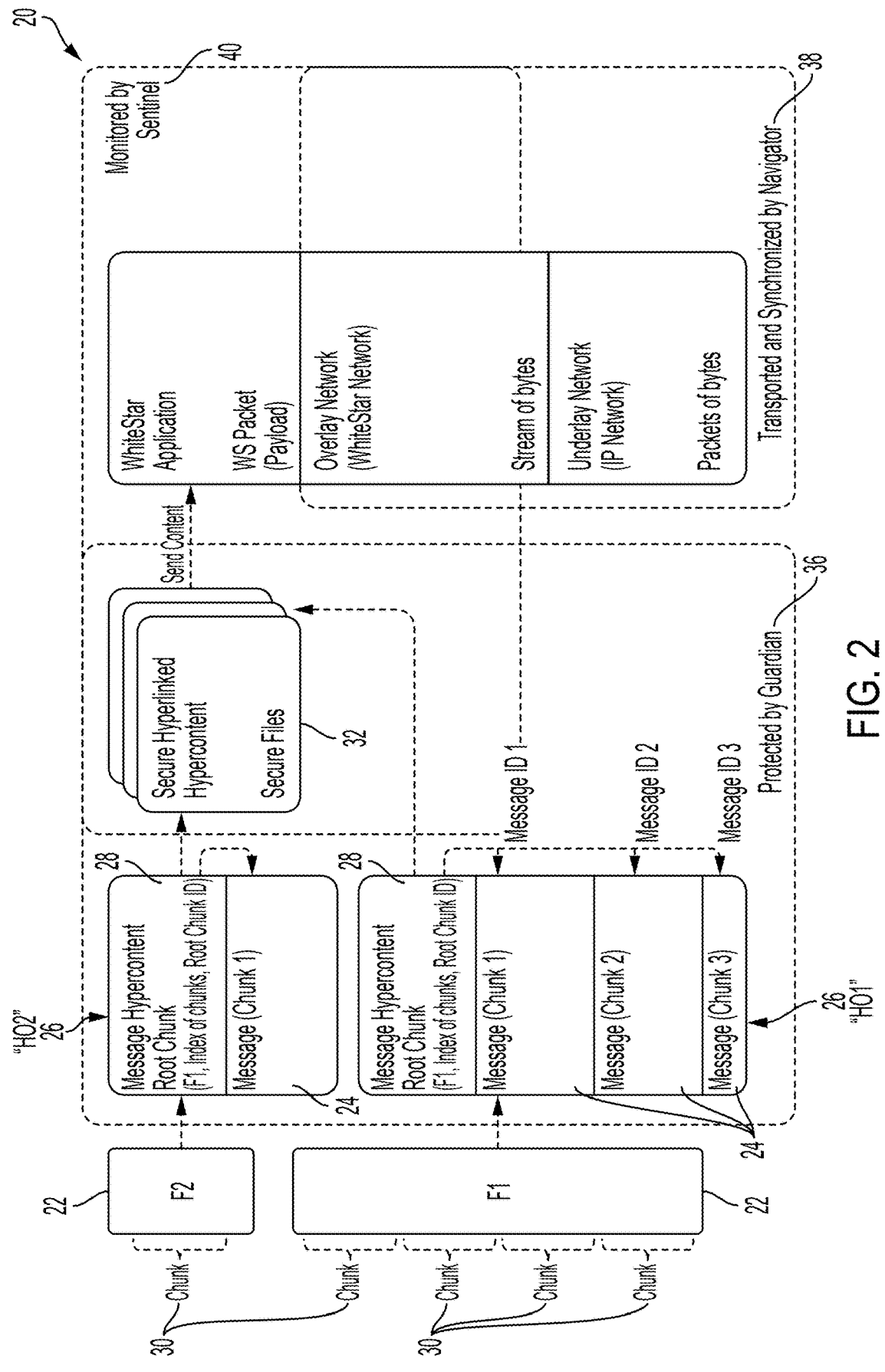
FIG. 2 illustrates an example content-aware transmission of network content by the apparatus of FIG. 1, according to an example embodiment.

FIG. 2 illustrates an example content-aware transmission of network content by a network device 12, 14, 16, and/or 18 of FIG. 1, according to an example embodiment. Existing IP networks are not content aware because IP networks were designed as a file-oriented network that moved opaque bytes of data as payload in IP data packets: addressing of an IP data packet is accomplished by a network device having a source IP address sending a data packet (of up to around 1500 bytes) to another network device having a destination IP address via an underlay network architecture.

As described in the above-incorporated U.S. Pat. Nos. 11,582,201, 11,792,186, 11,924,177, or 12,058,243, however, an IP address does not, in fact, accurately represent any one of a business, a location, a person, or a physical network device. Further, files are partitioned arbitrarily into 1500 byte payloads inserted into IP data packets that are transmitted via an IP data network as a stream of IP packets; reception of the stream of IP packets by a destination according to a traditional network stack includes a physical network layer receiving data bytes from the IP packets, reassembly of the data bytes as IP data packets at a data link layer, reordering of IP data packets at a transport layer (e.g., TCP), and reassembly of the files at the application layer. Hence, the IP network cannot understand the content of the bytes within a payload of an IP packet, hence the IP packet payload is "opaque" to the IP network. Moreover, a payload of an IP packet may contain bytes from two different files. Further, the IP network is implemented as an "underlay" network where the IP network is "under" other protocols such as TCP/IP, SSL/SSH, etc.

In contrast, the secure data network 5 is a content-oriented network that can move network content over one or more private networks to specific trusted individuals having established themselves as cohorts. Each network device 12, 14, 16, and 18 executes a corresponding network operating system 20 that generates for the network device 12, 14, 16, and 18 a corresponding cryptographically-unique endpoint identifier (endpoint ID); each network device 12, 14, 16, and 18 also belongs to a unique federation having a corresponding cryptographically-unique federation identifier (federation ID) generated by the network operating system 20 in the first network device 12, 14, 16, or 18 of that unique federation.

Any communication of a network content item 22 between two or more network devices 12, 14, 16, and/or 18 can be based on replication of a conversation object having a corresponding cryptographically-unique conversation identifier (conversation ID) generated by the network operating system 20 having created the conversation; the conversation object can identify or reference zero or more messages identifiers (message IDs) that are cryptographically generated by the network operating system 20 of the network device having generated a message object 24. Each conversation ID and each message ID includes the federation ID of the endpoint device 12 having generated the corresponding conversation object or message object 24. The federation ID in each conversation ID and/or message ID establishes authoritative ownership rights that enable the owner to control distribution and storage of the corresponding conversation object or message object.

Each conversation object also can include a subscriber list specifying at least the federation ID of the federation of the endpoint device 12 that created the conversation object, and optionally one or more other federation IDs of invited participants to the conversation. A given message object 24 can be referenced in more than one conversation objects, enabling the message object 24 to be replicated to different subscribers specified in the subscriber list according to different policies based on ownership of the conversation object.

Additional details regarding the endpoint ID, the federation ID, the conversation ID, and the message ID are described in further detail for example in the above-incorporated U.S. Pat. Nos. 11,582,201, 11,792,186, 11,924,177, and 12,058,243.

Each network operating system 20 executed in a network device 12, 14, 16, and/or 18 can respond to receiving a network content item "F1" or "F2" 22 (e.g., from another locally-executable resource accessing the network operating system 20 via a prescribed API executed within and required by the network operating system 20) by generating a hyperlinked hypercontent object 26 that comprises a hypercontent root data object or "root chunk" 28 and one or more data objects or "message chunks" 24 containing respective data chunks of the network content item 22. Each message chunk 24 may have a size up to one megabyte (1 Mbyte).

In an example embodiment, the root chunk 28 can be implemented as a conversation object having a corresponding conversation ID. In a second example embodiment, the root chunk 28 can be implemented as a message object belonging to one or more conversations and having a corresponding message ID. Hence, the root chunk 28 is a first class data object in the secure data network 5 that has a corresponding unique root chunk ID that contains the federation ID created by the network operating system 20 of the network device 12, 14, 16, and/or 18 having created the hyperlinked hypercontent object 26.

In particular, the transfer of a network content item "F1" or "F2" by a network device 12, 14, 16, and/or 18 in the secure data network 5 is executed based on the network operating system 20 in the network device 12, 14, 16, and/or 18 dividing each network content item "F1" or "F2" 22 independently into one or more data chunks 30, and adding the one or more data chunks 30 of the network content item "F1" or "F2" into one or more message chunks 24 of the corresponding hyperlinked hypercontent object 26; in other words, a message chunk 24 contains a corresponding data chunk 30 from only one network content item "F1" or "F2", and a message chunk 24 does not contain data bytes from two different network content items "F1" and "F2".

Hence, the reception of a network content item "F1" and "F2" by a network operating system 20 executed in a network device 12, 14, 16, and/or 18 causes the network operating system 20 to create a corresponding hyperlinked hypercontent object 26 for each network content item "F1" or "F2". Each hyperlinked hypercontent object 26 comprises a corresponding root chunk 28 that identifies the federation ID of network device 12, 14, 16, and/or 18 having generated the hyperlinked hypercontent object 26; each hyperlinked hypercontent object 26 also references zero or more message chunks 24 based on a message ID assigned to the message chunk, where each the one or more message chunks 24 of a hyperlinked hypercontent object 26 contain a data chunk 30 from only the corresponding network content item 22 represented by the corresponding hyperlinked hypercontent object 26; hence, the message chunks 24 of the hyperlinked hypercontent object "HO1" 26 contain the data chunks 30 from only the network content item "F1" 22, and the message chunk 24 of the hyperlinked hypercontent object "HO2" 26 contains the data chunk 30 from only the network content item "F2" 22.

The root chunk 28 generated by the network operating system 20 for the network content item "F1" 22 may include message identifiers (e.g., "Message ID1", "Message ID2", and "Message ID3") as described above as respective references to the message chunks (e.g., "Chunk 1", "Chunk 2", and "Chunk 3") 24; the root chunk 28 generated by the network operating system 20 for the network content item "F2" 22 may include a single message identifier that references the message containing the file F2 in its entirety. Each of the chunks 24 and 28 illustrated in FIG. 2 may have size of from 0 to 1 Mbytes. Hence, each file F1 or F2 22 can be transmitted as a hyperlinked hypercontent root chunk (also referred to herein as a "root chunk") 28 and an array of one or more message chunks 22 that may be transmitted as a sequence or stream of messages encrypted within respective secure content-oriented packets (34 of FIG. 3) described below, each message chunk 24 referenced in the root chunk 28.

Hence, each network operating system 20 executed in a network device 12, 14, 16, and/or 18 can execute content-aware transmission of network content 22 via the GTS database device 18, based on the addressing using the endpoint ID and federation ID of a network device, a conversation ID of a conversation, a message ID of a message object 24, and/or a root chunk ID of a root chunk 28.

Each network operating system 20 executed in a network device 12, 14, 16, and/or 18 can securely store a root chunk 28 and each associated message chunk 24 as locally secure data structures 32: the secure data structures can be a secure "at-rest" data structure and/or secure "in-flight" data structures queued for transmission via the secure data network 5. An "at-rest" data structure can be encrypted using the private key generated by the network operating system 20 for the network device 12, 14, 16, and/or 18 (e.g., "EP1") having generated the hyperlinked hypercontent object 26. An "in-flight" data structure can be encrypted using a secure public key of a cohort destination device (e.g., "EP2"), for example based on encrypting a root chunk 28 or a message chunk 24 into an encrypted root chunk or an encrypted message chunk using a time-based temporal key having a value that increases (e.g., monotonically) relative to an epochal start time, encrypting the temporal key into an encrypted temporal key using the secure public key of the destination device, and adding the encrypted root chunk or encrypted message chunk and the encrypted temporal key to a secure content-oriented packet 34, also referred to as a "secure data packet" 34.

Additional details regarding a network device sending hyperlinked hypercontent comprising an encrypted root chunk and an encrypted message chunk to a destination device are described in commonly-assigned, copending application Ser. No. 17/532,740, filed Nov. 22, 2021, published May 25, 2023 as U.S. Pub. 2023/0164121 and entitled "AUTONOMIC DISTRIBUTION OF HYPERLINKED HYPERCONTENT IN A SECURE PEER-TO-PEER DATA NETWORK", the disclosure of which is incorporated in its entirety herein by reference.

The network content item 22 also can be implemented as a streaming media session comprising a sequential stream of audio and/or video packets; hence, the hyperlinked hypercontent object 26 can include a root object describing the streaming media session (e.g., as a conversation object of a secure streaming audio/video chat or conference meeting) and identifying a message object 24 containing a streaming media chunk that is updated with streaming media data received from a streaming media source (e.g., executed within the network device 12, 14, 16, and/or 18 or locally connected to the network device) for updated retrieval by a destination endpoint device. Additional details regarding securely transporting streaming media as a hyperlinked hypercontent object are described in commonly-assigned, application Ser. No. 17/552,586, filed Dec. 16, 2021, issued Jul. 30, 2024 as U.S. Pat. No. 12,052,266 and entitled "SECURE STREAMING MEDIA BASED ON UPDATING HYPERCONTENT IN A SECURE PEER-TO-PEER DATA NETWORK", the disclosure of which is incorporated in its entirety herein by reference.

As illustrated in FIG. 2, the network operating system 20 comprises an executable guardian agent 36, an executable navigator agent 38, and an executable sentinel agent 40 that collectively provide a real-time AI based security suite. The guardian agent 36 is configured for executing the generating of the hyperlinked hypercontent object 26 in response to receiving a network content item 22, encrypting the root chunk 28 and each message chunk 24 of a hyperlinked hypercontent object 26 for secure "at-rest" storage in the network device or "in-flight" communications in the secure data network 5. The guardian agent 36 is configured for providing real-time threat protection in the AI based security suite, providing AI-based expertise in a real-time detection of a cyber threat in the network device. The guardian agent 36 can provide AI-based expertise in secure policy enforcement of executable code within the network operating system 20, and can execute machine learning (ML) to ensure its real-time protection operations are sufficient to withstand existing and newly-discovered cyber threat techniques.

The navigator agent 38 is configured for controlling the transport and secure synchronization of a secure content-oriented packet 34 to a destination device via the secure data network 5. The navigator agent 38 can provide real-time secure connection management in the AI based security suite, including AI-based expertise in real-time tracking and risk-assessment of available wireless data networks. The navigator security agent 38 can determine, for each of the available wireless data networks, a corresponding machine learning (ML) based risk assessment that identifies a corresponding risk in encountering a cyber threat on the corresponding wireless data network. Hence, the navigator security agent 38 can "navigate" among available wireless data networks to supply a recommendation (e.g., to the guardian security agent 36 and/or the sentinel security agent 40) for connecting to a "safe" data link and avoiding a "hazardous" data link susceptible to cyber threats.

The sentinel agent 40 is configured to provide real-time threat protection in the AI based security suite, including providing AI-based expertise in a real-time detection of a cyber threat in the network device, and real-time execution of a corrective action to at least mitigate (if not remove) the cyber threat based on machine learning-based decisions upon evaluation of the cyber threat. The sentinel agent 40 also can detect any tampering attempts during secure transport of any secure content-oriented packet 34 via the secure data network 5: if necessary, the sentinel security agent 40 can execute a cryptographic "self-destruction" of a physical network device in response to detecting a "persistent consistent threat", in order to halt any further spread of the persistent consistent threat to other physical network devices in the secure peer-to-peer data network 5. The sentinel security agent 40 also can execute machine learning (ML) to ensure its real-time detection and correction operations are sufficient to withstand the existing and newly-discovered cyber threat techniques, for example based on autonomic synchronization with peer security agents in other network devices in the secure peer-to-peer data network.

Additional details regarding the guardian agent 36, the navigator agent 38, and the sentinel agent 40 are described in commonly-assigned, application Ser. No. 17/361,501, filed Jun. 29, 2021, published Dec. 29, 2022 as U.S. Pub. 2022/0417252 and entitled "DISTRIBUTED SECURITY IN A SECURE PEER-TO-PEER DATA NETWORK BASED ON REAL-TIME GUARDIAN PROTECTION OF NETWORK DEVICES", the disclosure of which is incorporated in its entirety herein by reference.

Figure 3:
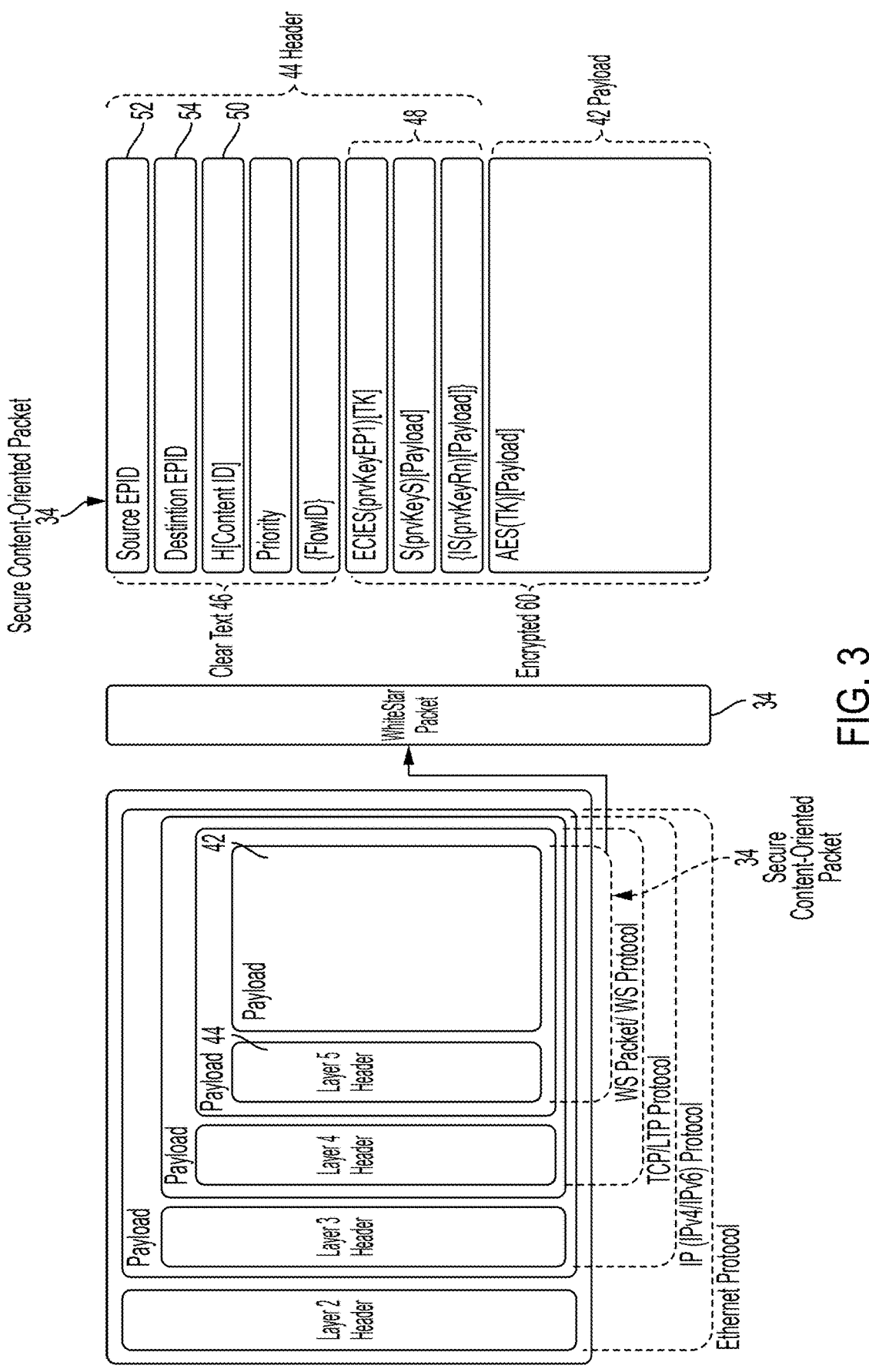
FIG. 3 illustrates insertion, by the apparatus of FIG. 1, of a content tracking identifier at a prescribed location within a secure content-oriented packet that causes geographical tracking and selective containment of network content within geographical boundaries, according to an example embodiment.

FIG. 3 illustrates an example secure content-oriented packet 34 generated by the network operating system 20 of FIG. 1, according to an example an example embodiment. As illustrated in FIGS. 2 and 3, the network operating system 20 in a network device 12, 14, 16, and/or 18 can securely transport each hyperlinked hypercontent object 26 via the secure data network 5 operating as an "overlay" network that can operate "above" an existing IP network 100. For example, the secure transport of encrypted chunks (e.g., an encrypted root chunk or encrypted message chunk) as encrypted payload 42 enables a content-aware transmission of a secure content-oriented packet 34 via the secure data network 5. The secure content-oriented packet 34 generated by the network operating system 20 can comprise a header 44 (e.g., at layer 5 of the OSI Reference Model) and an encrypted payload 42; the layer 5 header 44 can include an unencrypted header portion 46 and an encrypted header portion 48. The secure content-oriented packet 34 also is referred to herein as a "WhiteStar Packet" (or "WS Packet") that is generated according to the operations executed by the network operating system 20 as described herein; the network operating system 20 also is referred to herein as a "WhiteStar Application"; the operations executed by the network operating system 20 in each of the network devices 12, 14, 16, and/or 18 also can be referred to herein as a "WhiteStar Protocol" (or "WS Protocol"); and the secure peer-to-peer data network 5 also can be referred to herein as a "Whitestar Network". Use of the term "WhiteStar" or "WS" is merely for convenience and does not in any way limit the operations of the network operating system 20, the secure data network 5, or the nature of any of the disclosed data structures or devices.

As illustrated in FIG. 3, the network operating system 20 executed in a sending network device 12, 14, 16, and/or 18 and implementing the overlay secure data network 5 can cause a secure content-oriented packet 34 (comprising a layer 5 header 44 and an encrypted payload 42) to be transmitted, via an underlay network, within a payload of one or more layer 4 packets (e.g., according to TCP or LTP protocol) each comprising a layer 4 header; each layer 4 packet can be transmitted within a payload of one or more layer 3 packets (e.g., according to IPv4 or IPv6 protocol) each comprising a layer 3 header; and each layer 3 packet can be transmitted within a payload of one or more layer 2 packets (e.g., according to Ethernet protocol) each comprising a layer 2 header.

Hence, the network operating system 20 executed in a sending network device 12, 14, 16, and/or 18 can cause a secure content-oriented packet 34 to be transmitted via the overlay secure data network 5 with content awareness of the secure content-oriented packet 34, using an underlay network (e.g., the wide area network 100) executing layer 4 protocol (e.g., TCP/LTP), layer 3 protocol (e.g. IPv4/IPv6), and a layer 2 protocol (e.g., Ethernet) to transport each secure content-oriented packet 34 as opaque payload within one or more IP data packets.

FIG. 3 also illustrates insertion, by the network operating system 20 executed in a sending network device 12, 14, 16, and/or 18 of FIG. 1, of a content tracking identifier 50 at a prescribed location within the unencrypted header portion 46 of the content-oriented packet 34. The content tracking ID 50 may be implemented for example as a SHA-256 hash of an identifier of the associated network content item 22 to prevent reverse-engineering that could identify the network content item 22. The content tracking ID 50 is generated and is always inserted by the network operating system 20 at a same prescribed location within the unencrypted header portion 46 (e.g., at a prescribed byte offset relative to a beginning of the layer 5 header 44), and can cause geographical tracking and selective containment of network content within geographical boundaries, according to an example embodiment. The content tracking ID 50 also can be implemented as a JSON (Javascript object notation) object.

As illustrated in FIG. 3, the layer 5 header 44 of the secure content-oriented packet 34 can comprise in the unencrypted header portion 46 a source endpoint ID 52 of the source network device generating the secure content-oriented packet 34, a destination endpoint ID 54, the content tracking identifier 50 (also referred to herein as a "ContentTrackingUUID"), an optional priority label 56, and an optional flow identifier 58. The flow identifier 58 can be added in case the secure content-oriented packet 34 is crypto-signed switched between one or more replicator devices 16, described in further detail in the above-incorporated U.S. Pat. No. 11,924,177.

The secure content-oriented packet 34 also can include an encrypted portion 60 that comprises the encrypted header portion 48 and the encrypted payload 42, encrypted by the network operating system 20 using a secure public key of a destination device 12, 14, 16, and/or 18 as described above.

The content tracking ID 50 in the unencrypted header portion 46 of the layer 5 header 44 enables a receiving network device in the secure data network 5 to identify that the secure content-oriented packet 34 is to be tracked based solely on the content tracking ID 50, or based on one or more additional attributes specified in the unencrypted header 46.

In an example embodiment, the content tracking ID 50 may be added to only the layer 5 header 44 of the secure content-oriented packet 34 carrying the root chunk 28 of the hyperlinked hypercontent object 26 and not any of the secure content-oriented packets 34 carrying message chunks 24 identified in the root chunk 28 illustrated FIG. 2; in another example embodiment, the content tracking ID 50 may be added to the layer 5 header 44 of each secure content-oriented packet 34 carrying a chunk of the hyperlinked hypercontent 26, including the root chunk 28 and each of the message chunks 26 identified by the root chunk 28.

Hence, a secure content-oriented packet 34 sent via the secure data network 5 can be interpreted by the network operating system 20 at a receiving network device 12, 14, 16, and/or 18 as belonging to a hyperlinked hypercontent object 26 representing a network content item 22 based on at least the content tracking ID 50, and optionally further based on other identifiable attributes specified in the layer 5 header 44. As described below, the deployment of one or more secure content-oriented packets 34 specifying a valid content tracking ID 50 in the prescribed location of the unencrypted header portion 46 (as opposed to a null value such as all zeros, all ones, alternating ones and zeros, etc.) enables executable virtual sensors deployed in the secure data network 5 to providing full content traceability of a hyperlinked hypercontent object 26 representing a network content item 22.

Figure 4:
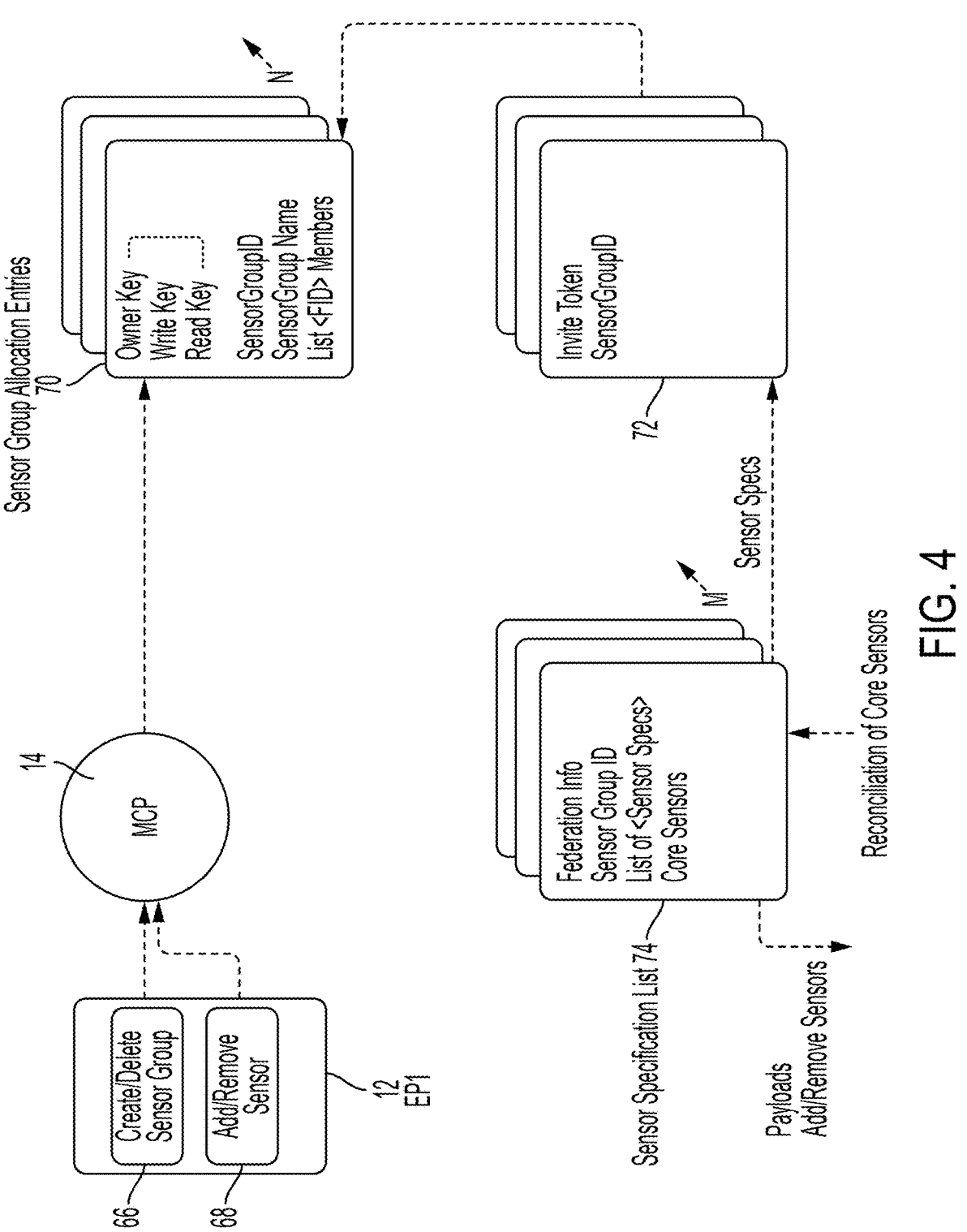
FIG. 4 illustrates deployment of one or more virtualized sensor groups comprising one or more virtual sensors for execution in the secure peer-to-peer data network of FIG. 1, according to an example embodiment.

FIG. 4 illustrates deployment of one or more virtualized sensor groups 62 comprising one or more executable virtual sensors 64 for execution in the secure peer-to-peer data network of FIG. 1, according to an example embodiment. A network operating system 20 executed in a network device 12, 16, and/or 18 can generate and securely send a first executable instruction 66 to the MCP device 14 to add or delete a virtualized sensor group 62, or a second executable instruction 68 to add or delete a virtual sensor 64 (illustrated in FIGS. 5A and 5B), for deployment of the virtual sensors 64 within the secure data network 5, for example in a path between a source network device 12, 14, 16, and/or 18 transmitting a secure content-oriented packet 34 and a destination device 12, 14, 16, and/or 18 that is an intended recipient of the secure content-oriented packet 34.

A virtualized sensor group 62 can contain one or more executable virtual sensors 64, where each virtual sensor 64 includes instructions causing a detecting network device (e.g., 12, 14, 16, and/or 18) executing the virtual sensor 64 to record a geospatial sensor recording (76 of FIGS. 5A and 5B) of a detected geospatial event using an allocated public write key: the network operating system 20 executing the virtual sensor stores on a non-transitory machine-readable storage medium (e.g., 94 of FIG. 7) a sensor recording (76 of FIGS. 5A and 5B) that specifies a geospatial event associated with a status of the detecting network device, a transmitting network device, and/or a next-hop network device, and/or transfer of secure content-oriented packet 34 via the secure data network 5.

In one example, a first instruction 66 and/or a second instruction 68 may be generated based on an administrator (e.g., within an administrator domain in the secure data network 5) using an endpoint device "EP1" as an administrative terminal to submit the instruction 66 and/or 68 to the MCP device 14.

In another example, a user of a prescribed domain (e.g., corporate customer domain) within the secure data network 5 can cause the network operating system 20 executed in an endpoint device 12 to generate and send a second instruction 68 to the MCP device 14 to add and/or remove virtual sensors 64, and create and/or delete virtualized sensor groups 62. The MCP device 14 can respond to the instructions 66 and/or 68 to create the virtualized sensor group 62 and/or virtual sensors 64 by creating and securely storing in the 18 a sensor group allocation entry 70. The sensor group allocation entry 70 comprises an owner public key, a write public key, and a read public key each cryptographically generated as secure public keys by the network operating system 20 in the endpoint device 12 creating the sensor group; the sensor group allocation entry 70 also may include a SensorGroupID, a SensorGroup Name, and a list of federations (e.g., by FederationID) to which the sensor group is to be applied.

Hence, generation of the sensor group allocation entry 70 can cause the originating network device 12, 14, or 16 having generated the first instruction 66 or the second instruction 68 (or the MCP device 14) to generate and send, to each of the available network devices 12 associated with a FederationID specified in the sensor group allocation entry 70, an invitation 72 to join a sensor conversation. The invitation 72 can specify an invitation token implemented as a secure public key cryptographically generated by the network operating system 20 of the network device having generated the first instruction 66. Hence, a federation ID in the sensor group allocation entry 70 can cause autonomic attraction and auto-replication of the virtual sensors 64 by the sentinel agents 40 executed within the endpoint devices 12 belonging to the federation ID identified in the sensor group allocation entry 70. Additional details regarding network devices joining a conversation such as a sensor conversation or attracting entities to join a conversation such as a sensor conversation are described for example in the above-incorporated U.S. Pat. No. 11,792,186, and application Ser. No. 17/372,607, filed Jul. 12, 2021, published Jan. 12, 2023 as U.S. Pub. 2023/0012373 and entitled "DIRECTORY SERVER PROVIDING TAG ENFORCEMENT AND NETWORK ENTITY ATTRACTION IN A SECURE PEER-TO-PEER DATA NETWORK," the disclosure of which is incorporated in its entirety herein by reference.

The network operating system 20 executed in a network device 12, 14, or 16 of a federation owning the virtualized sensor group 62 also can define each virtual sensor 64 based on generating a sensor specification list 74 that can identify the owning federation by FederationID, the sensor group ID of the virtualized sensor group 62 as specified in the sensor group allocation entry 70, a list of sensor specifications defining each of the virtual sensors to be implemented by the network devices 12, 14, 16, and/or 18 of the invited federations as specified in the sensor group allocation entry 70. Each sensor specification 74 for a virtual sensor 64 can include unique public write keys used for generating a sensor recording and securely storing the sensor recording in the GTS database device 18.

Each sensor specification 74 (also referred to as a "sensor specification list" 74) for a virtual sensor 64 also can include one or more public read keys for reading of the sensor recordings from the GTS database device 18, and/or sorting of the sensor recordings from the GTS database device 18. For example, the network operating system 20 executed in an endpoint device 12 of a federation owning the virtualized sensor group 62 also can define each virtual sensor 64 based on generating a sensor specification list 74 that can identify the owning federation by FederationID, the sensor group ID, and can specify a sensor specification defining each of the virtual sensors 64 to be implemented via invited network devices 12, 14, 16, and/or 18 in the secure data network 5. Each sensor specification list 74 for a virtual sensor 64 can include unique public read keys for sorting of sensor recordings.

Hence, the network operating system 20 executed in the MCP device 14 and/or the originating network device 12 can cause a virtualized sensor group 62 to be deployed to one or more network devices 12, 14, 16, and/or 18 of each federation identified in the sensor group allocation entry 70, where each of the federations identified in the sensor group allocation entry 70 can include one or more endpoint devices 12 or replicator devices 16 that become subject to monitoring by the virtual sensors 64 in the virtualized sensor group 62.

Further, only a network operating system 20 of a network device in a federation that contains the owner public key contained in the sensor group allocation entry 70 can modify or delete the virtualized sensor group 62 or one or more of the virtual sensors 64 in the virtualized sensor group 62. Only a network operating system 20 of the network devices that contain the write public key specified in the sensor group allocation entry 70 as associated with a virtual sensor 64 and/or a virtualized sensor group 62 can write associated sensor recordings 76 to the GTS database device 18, and only a network operating system 20 of network devices with the read public key can read the associated sensor readings 76 from those virtualized sensor groups 60 having stored sensor recordings in the GTS database device 18.

Hence, an enterprise customer that owns or leases a domain in the secure data network 5 may implement its own content tracking via the secure data network 5, based on the enterprise customer using its own encryption keys (owner public key, write public key, and read public key) for causing its virtual sensors 64 to record sensor readings as sensor recordings 76 using the enterprise customer write public key; only the enterprise customer (and other federations having been granted access to the enterprise customer read public key) can read the associated sensor recordings 76 from the GTS database device 18. Any entity that does not have possession of the owner public key, the write public key, or read public key identified in the sensor group allocation entry 70 cannot access any of the virtual sensors 64 of the virtualized sensor group 62, write into the GTS database device 18 any sensor recordings associated with the virtualized sensor group 62, or read any of the sensor recordings associated with the virtualized sensor group 62 and stored in the GTS database device 18.

Other domains within the secure data network 5 (e.g., administrative domains, other enterprise customer domains, etc.), can have their own sets of owner/write/read public keys, ensuring that content data, sensor recordings and associated metadata, and content tracking services within the secure data network 5 can be securely partitioned. Hence, each domain (e.g., administrative domain, enterprise customer domain, etc.) can have its own set of zero or more virtual sensors 64 within its own virtualized sensor group 62, where each virtualized sensor group 62 can have one or more types of virtual sensors 64, each virtualized sensor group 62 has its own set of owner/write/read public keys generated by the federation owning the virtualized sensor group 62, where the write public keys are used to create sensor data for federations, and the read public keys are used to read sensor data.

A federation owning a virtualized sensor group 62 can selectively share one or more sensor recordings with a third party, such as another federation in the secure data network 5, based on sending an invitation 72 to join a sensor conversation associated with the virtualized sensor group 62 (identified by SensorGroupID), including providing a read public key.

Figure 5B:
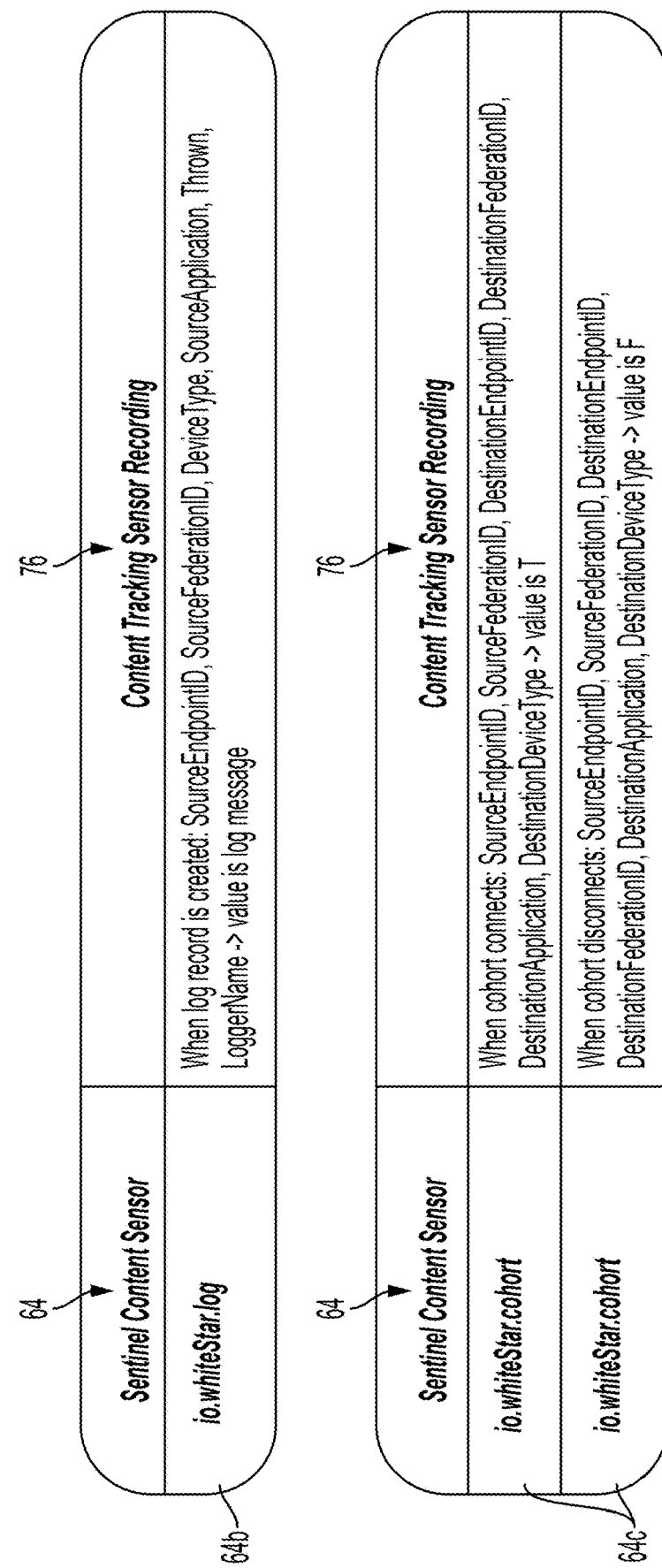

FIGS. 5A and 5B illustrate example virtual sensors 64 that can be implemented in the secure data network 5 based on an instruction 66 and/or 68 from a user of the endpoint device "EP1" 12 of FIG. 4. FIG. 5A illustrates example virtualized sensors 64 of type "content" 64*a* and respective example sensor recordings 76 specifying attributes associated with geospatial events detected and recorded by the respective virtualized sensors 64*a* of type "content".

FIG. 5B illustrates an example virtualized sensor 64 of type "log" 64*b* and a corresponding example geospatial sensor recording 76 specifying attributes associated with a geospatial event detected and recorded by the corresponding virtualized sensor 64*b* of type "log". FIG. 5B also illustrates example virtualized sensors 64 of type "cohort" 64*c* and respective example sensor recordings 76 specifying attributes associated with geospatial events detected and recorded by the respective virtualized sensors 64*c* of type "cohort". Other types of virtual sensors can be defined by a user of an endpoint device 12 and deployed for distributed execution in the secure data network 5.

Each of the virtual sensors 64 of FIGS. 5A and 5B and the generation of the respective sensor recordings 76 can be executed within a sentinel agent 40 in the network operating system 20 and sent securely to the GTS database device 18.

FIGS. 5A and 5B illustrate an example naming convention for a virtual sensor 64 that can start with a uniquely qualified name (e.g., domain name) of an organization executing the virtual sensors (e.g., "Io.whiteStar"), followed by a sensor type (e.g., "content", "log", or "cohort") and an optional notification event type (e.g., "created", "L3Relay", "L5Relay", "origin", "destination", "changed", "deleted", or "viewed" for "content" types 64*a*).

A virtual sensor 64 of type "content" (also referred to herein as a virtual "content" sensor 64*a*) (also referred to herein as a virtual "content trace" sensor) can cause tracing of at least a root chunk 28 of a hyperlinked hypercontent object 26 as the root chunk 28 traverses the secure data network 5.

For example, reception of a network content item 22 by a network operating system 20 executed in the endpoint device "EP1" and generation of a corresponding hyperlinked hypercontent hyperlinked hypercontent object 26 can cause a sentinel agent 40 executing a virtual sensor 6a4 named "io.whiteStar.content.created" to detect the geospatial event and generate a corresponding geospatial sensor recording 76 specifying attributes associated with when and where the network content was created, including for example Time, Location, ContentTrackingUUID, Source FederationID, FileName, FileType, FileSize, ContentRating, SourceEndpointID, and TotalChunks. The geospatial sensor recording 76 also can specify a prescribed sensor recording value that can be set to "0" (zero) indicating a content tracking type sensor recording.

Detection by the sentinel agent 40 executed the endpoint device "EP1" of an initiated transmission of a secure content-oriented packet 34 specifying the content tracking ID 50 to a next-hop device (e.g., a replicator device "R1" 16 or a destination network device (e.g., a file server, community server, a destination endpoint device "EP2", etc.) in the secure data network 5 can cause a virtual sensor 64a, named "io.whiteStar.content.origin", executed in the sentinel agent 40 in the source network device that created the hyperlinked hypercontent object 26, to detect a geospatial event and create a geospatial sensor recording 76 specifying attributes associated with when and where the secure content-oriented packet 34 was transmitted, including for example Time, Location (of source network device), ContentTrackingUUID, Source FederationID, FileName, FileType, FileSize, ContentRating, SourceEndpointID, TotalChunks. The geospatial sensor recording 76 also can specify a prescribed sensor recording value that can be set to "0" (zero) indicating a content tracking type sensor recording.

Reception of a secure content-oriented packet 34 specifying the content tracking ID 50 can cause a virtual sensor 64a named "io.whiteStar.content.destination", executed in the sentinel agent 40 in the destination network device, to detect a geospatial event and create a geospatial sensor recording 76 specifying attributes associated with when and where the secure content-oriented packet 34 was received, including for example Time, Location (of destination network device), ContentTrackingUUID, Source FederationID, FileName, FileType, FileSize, ContentRating, SourceEndpointID, TotalChunks, and TransferTarget; the geospatial sensor recording 76 also can specify Destination FederationID, and DestinationEndpointID. The geospatial sensor recording 76 also can specify a prescribed sensor recording value that can be set to "0" (zero) indicating a content tracking type sensor recording.

Any change in the hyperlinked hypercontent object 26 in a network device can cause a virtual sensor 64a named "io.whiteStar.content.changed", executed in the sentinel agent 40 in the network device detecting the change, to detect a geospatial event and create a geospatial sensor recording 76 and specifying attributes associated with when and where the hyperlinked changed, including for example Time, Location, hypercontent object 26 was ContentTrackingUUID, Source FederationID, FileName, FileType, FileSize, ContentRating, SourceEndpointID, and TotalChunks; the geospatial sensor recording 76 also can specify Changed Federation ID and ChangedEndpointID identifying the modifying entity and endpoint device that changed the hyperlinked hypercontent object 26, and IdentifiedChanges that can identify one or more changes between the original hyperlinked hypercontent object 26 and the changed hyperlinked hypercontent object 26. Hence, depending on implementation a policy can be established that may selectively prevent the changed hyperlinked hypercontent object 26 from being stored locally in any network device executing the network operating system 20 or prevent the changed hyperlinked hypercontent object 26 from being distributed via the secure data network 5: such a policy can be implemented in order to enforce Digital Rights Management (DRM) policies, for example if the modifying entity Changed Federation ID does not match the source entity Source FederationID. The geospatial sensor recording 76 also can specify a prescribed sensor recording value that can be set to "0" (zero) indicating a content tracking type sensor recording.

Deletion of one or more chunks of a hyperlinked hypercontent object 26 by a network device can cause a virtual sensor 64a named "io.whiteStar.content.deleted", executed in the sentinel agent 40 in the network device detecting the deletion, to detect a geospatial event and create a geospatial sensor recording 76 specifying attributes associated with when and where the network content was deleted, including for example Time, Location, ContentTrackingUUID, Source FederationID, FileName, FileType, FileSize, ContentRating, SourceEndpointID, and TotalChunks; the geospatial sensor recording 76 also can specify Deleting FederationID, and DeletingEndpointID identifying the deleting network device by its FederationID and EndpointID. The geospatial sensor recording 76 also can specify a prescribed sensor recording value that can be set to "0" (zero) indicating a content tracking type sensor recording.

A viewing of at least a portion of the network content item 22 based on transfer of a "chunk" 26 or 28 to a locally executable resource outside the network operating system 20 via a prescribed API executed within the network operating system 20 can cause a virtual sensor 64a named "io.whiteStar.content.viewed", executed in the network device, to detect the viewing as a geospatial event and create a geospatial sensor recording 76 specifying attributes associated with when and where the network content was viewed, including for example Time, Location, ContentTrackingUUID, Source FederationID, FileName, FileType, FileSize, ContentRating, SourceEndpointID, and TotalChunks; the geospatial sensor recording 76 also can specify ViewingFederationID, and ViewingEndpointID identifying the viewing network device by its FederationID and EndpointID. The geospatial sensor recording 76 also can specify a prescribed sensor recording value that can be set to "0" (zero) indicating a content tracking type sensor recording.

The above-identified virtual sensors 64a of type "content" can be implemented for peer-to-peer connections with a cohort, e.g., connections that are only via a peer-to-peer connection that does not include any Level 5 replicator device 16 or any Level 3 relay via a replicator device in the secure data network 5. In case that a sending network device (e.g., "EP1" 12) transmits a secure content-oriented packet 34 specifying a content tracking ID 50 via the secure data network 5 (including via one or more replicator devices 16 in the core network 10), a virtual sensor 64 named "io.whiteStar.content.L5Relay", executed in the sentinel agent 40 of a replicator device 16 can generate a geospatial sensor recording 76 specifying attributes associated with when and where the secure content-oriented packet 34 was relayed by the replicator device 16, including for example Time, Location, SourceEndpointID, SourceFederationID, DestinationEndpointID, DestinationFederationID, ReplicatorEndpointID, and ContentTrackingUUID. The geospatial sensor recording 76 also can specify a prescribed sensor recording value that can be set to "0" (zero) indicating a content tracking type sensor recording.

Hence, in case that the source network device (e.g., "EP1" 12) and the destination network device (e.g., "EP2" 12) have a logical connection to one or more different replicator devices (e.g., "R1" 16 and/or "R100), the source network device and a first replicator device may have a cohort pair relationship (i.e. a two-way trusted relationship), the first replicator device and the second replicator device may have a corresponding cohort pair relationship, and the second replicator device and the destination network device may have a cohort pair relationship. Hence, in response to the first replicator device detecting a secure content-oriented packet 34 that includes a content tracking ID 50, a virtual sensor 64*a* named "io.whiteStar.content.L5Relay", executed by the sentinel agent 40 in the first replicator device can record a geospatial sensor recording 76 as a level 5 relay geospatial event specifying the identities of the source endpoint ID, source federation ID, destination endpoint ID, destination federation ID, the first replicator device ID, a unique content tracking ID, plus the location of the first replicator device and the time of reception of the packet including the content tracking ID.

As described previously, the content tracking ID 50 can be added to the layer 5 header 44 of a secure content-oriented packet 34 carrying an encrypted root chunk and the layer 5 header 44 one or more secure content-oriented packets 34 carrying an encrypted message chunk identified in the root chunk; as another example, the content tracking ID 50 can be added to the layer 5 header 44 of only the secure content-oriented packet 34 carrying the encrypted root chunk and none of the secure content-oriented packets 34 carrying one or more encrypted message chunks. Hence, a sentinel agent 40 in the first replicator device (e.g., "R1" 16) can generate one or more sensor recordings 76 for a given hyperlinked hypercontent object 26 based on whether one or more of the secure content-oriented packets 34 carrying encrypted message chunks include the content tracking ID 50.

In case that a path between two network devices 12, 14, 16, and/or 18 in the secure data network 5 includes a commercially available layer 3 switch or router (78 in FIG. 1) that does not have higher than layer 3 capabilities (e.g., a router in a private IP network), the layer 3 switch 78 can be configured by a network administrator of the private IP network with instructions to execute a virtual sensor 64', named "io.whiteStar.content.L3Relay", that can detect the content tracking ID 50 at the prescribed location of the layer 5 header 44 and in response generate a geospatial sensor recording 76 specifying attributes associated with when and where the content tracking ID 50 was detected, including for example Time, Location, SourceEndpointID, SourceFederationID, DestinationEndpointID, DestinationFederationID, ReplicatorEndpointID, and ContentTrackingUUID. The geospatial sensor recording 76 also can specify a prescribed sensor recording value that can be set to "0" (zero) indicating a content tracking type sensor recording. The virtual sensor "io.whiteStar.content.L3Relay" 64' can obtain the location information from a local GPS source, or alternately based on executing a reverse location lookup and mapping of an IP address to a general geographic location.

Hence, a hardware-based layer 3 switch 78 can locate whether the content tracking ID is present at the prescribed byte position based on calculating an offset relative to a beginning of the layer 5 header 44 to locate the field containing the content tracking ID 50; additional instructions can be added to the hardware-based layer 3 switch to identify the content tracking ID 50, e.g., detection of a prescribed byte value at a beginning of the prescribed byte position. In case that the content tracking ID is detected, the virtual sensor 64' executed in the layer 3 switch 78 can record a layer 3 relay reading.

The virtual sensor "io.whiteStar.content.L3Relay" 64' executed in the layer 3 switch/router 78 can forward the geospatial sensor recording 76 to a next hop device (e.g., the replicator device "R1" 16) at a same time as a data packet carrying the content tracking ID 50 in the layer 5 header 44, or can forward the geospatial sensor recording 76 separately from the data packet carrying the content tracking ID 50 in the layer 5 header 44.

FIG. 5B illustrates example virtual sensors 64 of type "log" 64*b* and "cohort" 64*c*. A virtual "log" sensor 64*b* executed by a sentinel agent 40 in a network device can be configured to record log events of certain values (including location and time and other relevant log attributes) from any device in the secure data network 5. For example, the log sensor can be entitled "Io.whiteStar.log" and can specify example attributes such as SourceEndpointID, SourceFederationID, DeviceType, SourceApplication, Thrown, and LoggerName. A prescribed value can be set in the geospatial sensor recording 76 to identify that the virtual sensor 64 is a log sensor recording.

A virtual "cohort" sensor 64*c* executed by a sentinel agent 40 in a network device can be configured to record a sensor reading as a cohort event each time a cohort is formed or severed, including the time and location of the cohort event and the affected cohort entities, where the "cohort" is a two-way trusted relationship between two network entities, e.g., between a user associated with a federation and a device, between a federation device such as an endpoint device (e.g., "EP1") 16 and a core network device such as a replicator device 16, and/or between two or more federations representing two respective users. For example, a virtual cohort sensor 64*c* can record a first user severing a relationship with a second user, or the first user severing a relationship with a network device in their federation (e.g., in response to detecting zeroizing of the network device). A virtual cohort sensor 64*c* also can detect if a data connection between the two network entities is established or disconnected, for example via direct peer-to-peer link layer connection, or via a hybrid connection via the secure data network 5 (e.g., if one of the network devices disconnects from the secure data network 5 or reconnects to the secure data network 5). Hence, the virtual cohort sensor 64*c* executed in the sentinel agent 40 at each end of the cohort pair can record as a geospatial sensor recording 76 the cohort event specifying a time and geospatial location that the relationship with the counterparty was severed or disconnected.

For example, the virtual cohort sensor "Io.whiteStar.cohort" 64*c* can respond to a detected connect by recording a geospatial sensor recording 76 containing the attributes SourceEndpointID, SourceFederationID, DestinationEndpointID, DestinationFederationID, DestinationApplication, DestinationDeviceType, where a prescribed value is set to "T" indicating the detected connect of a cohort.

In another example, the virtual cohort sensor "Io.whiteStar.cohort" 64*c* can respond to a detected disconnect by recording a "Io.whiteStar.cohort" containing the attributes SourceEndpointID, SourceFederationID, DestinationEndpointID, DestinationFederationID, DestinationApplication, DestinationDeviceType, where a prescribed value is set to "F" indicating the detected connect of a cohort.

Figure 6:
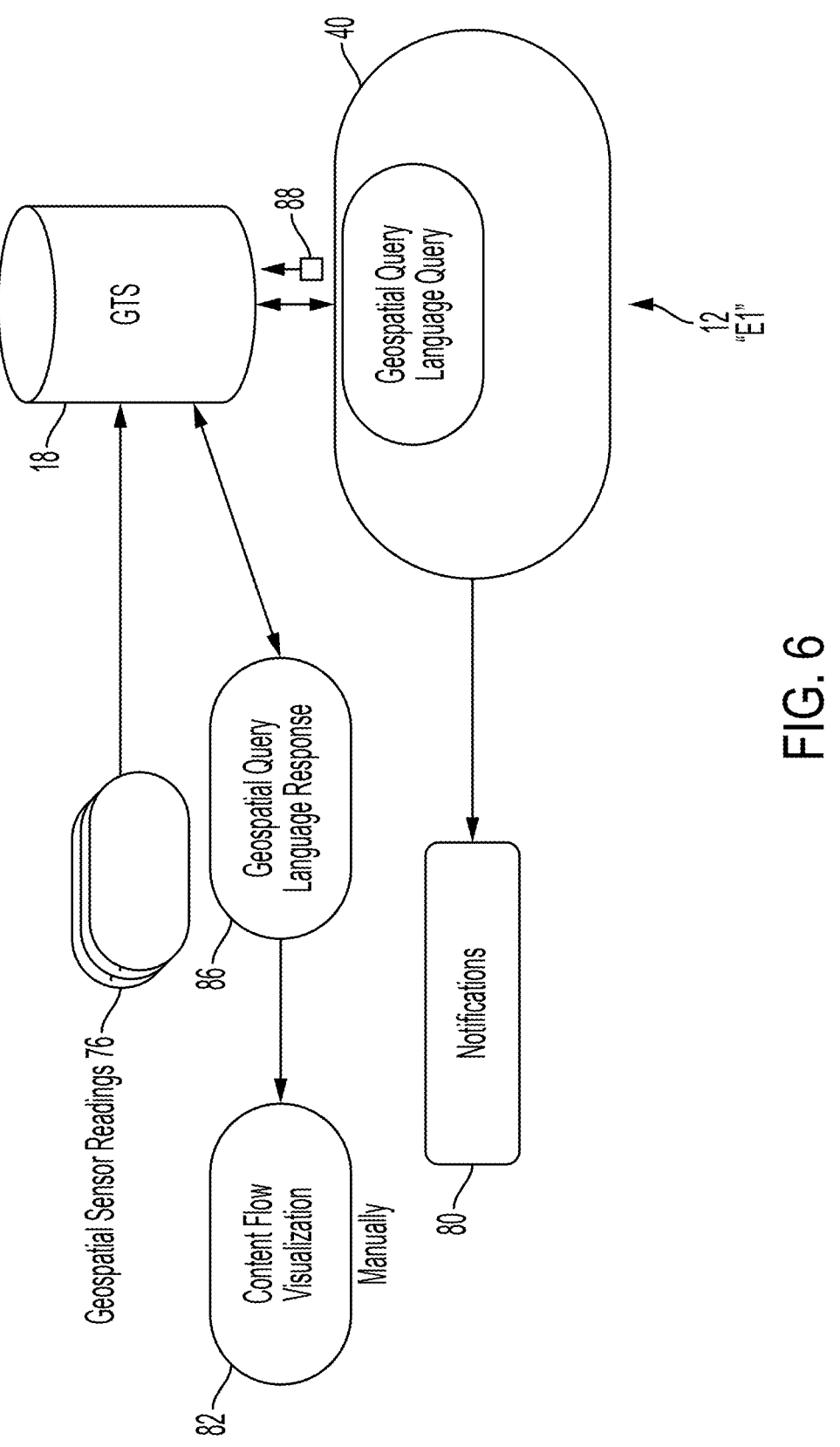
FIG. 6 illustrates example aggregation of sensor recordings recorded by one or more virtual sensors of FIGS. 5A and 5B, causing geographical tracking and selective containment within geographical boundaries of network content in the secure peer-to-peer data network of FIG. 1, according to an example embodiment.

FIG. 6 illustrates example aggregation of sensor recordings 76 recorded by one or more virtual sensors 64 of FIGS. 5A and/or 5B, enabling geographical tracking and selective containment of network content within geographical boundaries in the secure peer-to-peer data network 5, according to an example embodiment.

As described previously, each of the sentinel agents 40 in each of the network devices 12, 14, and 16 can securely send one or more sensor recordings 76 to the GTS database device 18 based on encrypting a sensor recording 76 with a temporal key, encrypting the temporal key with a public key associated with the GTS database device 18, and inserting the encrypted sensor recording and the encrypted temporal key in a secure data packet, described in further detail in the above-incorporated U.S. Pat. Nos. 11,582,201, 11,792,186, 11,924,177, and 12,058,243, and above-incorporated U.S. Publication No. 2023/0164121.

Each replicator device 16 receiving one or more geospatial recordings 76 from an attached endpoint device 12 can execute a second level of caching for sensor readings from all logically attached endpoints 12 that belong to the same enterprise customer domain and thus using the same write public keys. Hence, a replicator device 16 may aggregate geospatial recordings 76 associated with a same write token into a queue table (QT of FIG. 1). Each replicator device also may include a forwarding information base FIB containing forwarding table entries for forwarding received geospatial recordings from attached endpoint devices 12 to the GTS database device 18. In response to a prescribed condition (e.g., the aggregated geospatial recordings 76 associated with a same write token in the queue table QT reach a prescribed storage threshold based on percent storage capacity or number of aggregated sensor readings, a detected quiescent interval relative to sensor reading traffic from the attached endpoint devices, etc.), the replicator device R1 16 can cause the aggregated sensor readings associated with a same write token to be securely sent to the GTS database device 18. The forwarding of the geospatial recordings 76 from the endpoint EP1 to the replicator device R1, and/or from the replicator device R1 to the GTS database device 18, can be implemented, for example, as updating of a message object and replicating the updates according to differential content updates as described in the above-incorporated applications.

The GTS database device 18 can be implemented using a publicly-available geospatial database system that can store geospatial data records and can respond to geospatial queries. An example geospatial database system is the publicly-available Warp 10 Open Source GTS by SenX, available at the website address "https://www.warp10.io/". The GTS database device 18 can be implemented based on a single server device; the GTS database device 18 also can be implemented using a multiple server device architecture for distributed execution of geospatial database operations.

Unlike a relational database (DB) or an object-oriented DB, the GTS database device 18 can execute a query language that is geospatially oriented. Hence, the GTS database device 18 can be queried for tracking geospatial events based on the geospatial recordings 76 stored in the GTS database device 18. Example geospatial queries can include "starting last Thursday until today, select all geospatial sensor readings for identified data flows that were within the geographical boundaries within the state of Tennessee and that had subsequent sensor readings outside the state of Tennessee" (or within a selected proximity to a geospatial location); alternative queries on the time-based side can include, "take all geospatial sensor readings for messages that are flowing out of a given geographical area, resample the geospatial sensor readings into buckets or groups of every one minute, and provide a summary of packet flows to different (geolocated and/or network-located) destinations by the minute".

Hence, the sentinel agent 40 can utilize scripts according to a prescribed geospatial query language (GQL) executable by the GTS database device 18 to detect geolocation events that are relevant and of interest to a network administrator or a domain administrator in the secure data network 5. For example, an administrator may generate an example notification request stating "send a notification in response to detecting a document of identified type is transmitted outside an identified geographical location or boundary," where the notification 80 can identify the sending device and location, the receiving device and location, and the time of the transmission from the sending device to the receiving device.

Additional sensor data also can be collected, aggregated, and correlated by the GTS database device 18. For example, the GTS database device 18 can respond to a geospatial query 88 requesting notification to a requesting user of a geospatial notification event, for example if a document is sent outside a prescribed geographical boundary (e.g., outside an state or country to another identified state or country); the GTS database device 18 also can respond to the same geospatial query 88 or a supplemental geospatial query requesting identification whether any passive physical sensors (e.g., infrared sensors) detected, within an identifiable location (e.g., within 100 feet of the geospatial notification event), any location of identifiable persons (e.g., via infrared readings, facial recognition of image data, detecting RFID tag data, etc.) within an identifiable time (e.g., five minutes) preceding the geospatial notification event. Hence, a user can generate and submit to the GTS database device 18 a reverse query to generate a reverse geospatial track identifying a time a person entered an identified location (e.g., a server room), enabling detection that two individuals entered an identified location while only a single individual gained access to the identified location using an RFID-enabled badge.

The sentinel agent 40 in an endpoint device 12 can communicate with the GTS database device 18, for example, based on establishing a secure conversation with the GTS database device 18 using a conversation object as a secure "chat" as described above, enabling the sentinel agent 40 executed in an endpoint device (e.g., "EP1") 12 to send the notification request 88 to the GTS database device 18. The GTS database device 18 can respond to the notification request 88 by generating and executing an appropriate GQL query, generating query results and outputting in the "chat" the query results to the sentinel agent 40 executed in the endpoint device (e.g., "EP1") 12. Hence, the sentinel agent 40 can respond to the query results by generating a geospatial notification 80 to the user of the endpoint device 12 (or other network devices 12, 14, or 16) having subscribed to a conversation for monitoring geospatial notifications 80, for example an identification of an identified data flow (identified by the content tracking ID 50) that has been (or is about to be) transmitted outside a prescribed geographical boundary.

Other types of virtual sensors 64 can be generated and deployed within the secure data network 5, as appropriate, for example in case one or more IoT devices are deployed with a network operating system 20. For example, a user can use the GQL to define one or more virtual sensors 64 for generation in the IoT devices of IoT-appropriate geospatial sensor recordings 76. For example, an example IoT-based virtual sensor can be implemented based on setting a command of "set a temperature in building XYZ to 72 degrees Fahrenheit"; the IoT-based virtual sensor can be deployed based on distribution (or attraction) of the IoT-based virtual sensor via the secure data network 5 to IoT devices belonging to a federation identified in the sensor group allocation entry 70 of FIG. 4, for example to IoT-based thermostat devices located on each floor of the specified building XYZ; each of the IoT-based thermostat devices can respond as actuators to the received command by setting themselves to 72 degrees Fahrenheit. Similarly, the virtual sensor 64 or a second virtual sensor 64 can aggregate geospatial temperature readings from each of the IoT-based thermostat devices on each floor of the building, and execute geospatial and/or time-based analytics (e.g. average temperatures on each floor or portion thereof, average overall temperature within the building, past averages and/or trending averages over time etc.).

FIG. 6 also illustrates that a user device having appropriate credentials (e.g., a read key) can send a GQL-based query to the GTS database device 18 without relying on the sentinel agent 40, enabling a user to manually obtain a GTS Query response 86 containing a content flow visualization 82 that can provide a graphical map of identified content flows through the secure data network 5, including a graphical identification of geographic, corporate, and/or jurisdictional boundaries that may define boundaries for the identified content flows. Hence, a user can visually determine from the content flow visualization 82 whether an identified content flow has been transmitted outside a prescribed geographical boundary or has been maintained within the prescribed geographical boundary.

Figure 7:
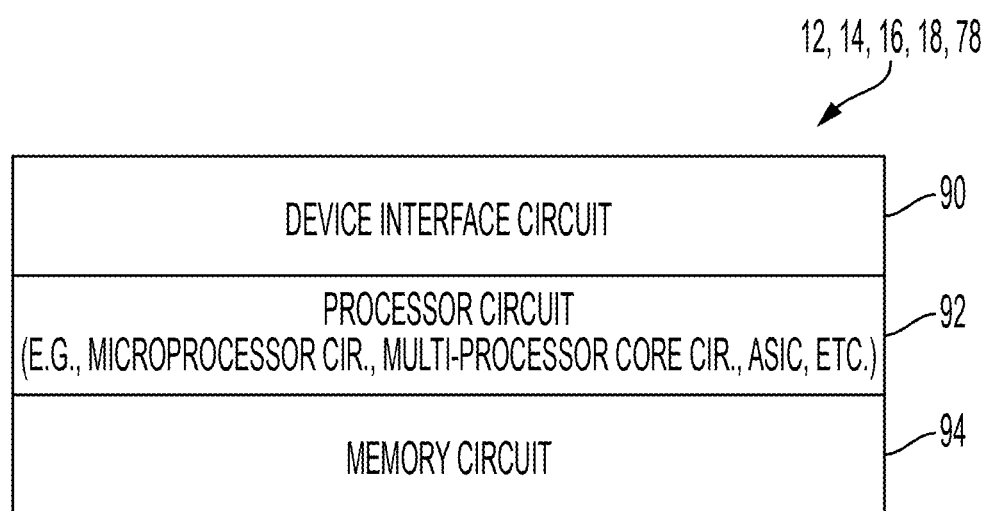
FIG. 7 illustrates an example implementation of any one of the devices of FIG. 1, according to an example embodiment.

FIG. 7 illustrates an example implementation of any one of the devices 12, 14, 16, 18, and/or 78 of FIG. 1, according to an example embodiment.

Each apparatus 12, 14, 16, 18, and/or 78 can include a device interface circuit 90, a processor circuit 92, and a memory circuit 94. The device interface circuit 90 can include one or more distinct physical layer transceivers for communication with any one of the other devices 12, 14, 16, 18, and/or 78; the device interface circuit 90 also can include an IEEE based Ethernet transceiver for communications with the devices of FIG. 1 via any type of data link (e.g., a wired or wireless link, an optical link, etc.); the device interface circuit 90 also may include a GNSS receiver and/or a GPS receiver providing location information, or may include a prescribed hardware interface for receiving GNSS/GPS based location signals from a locally-available GNSS/GPS receiver. The processor circuit 92 can be configured for executing any of the operations described herein, and the memory circuit 94 can be configured for storing any data or data packets as described herein.

Any of the disclosed circuits of the devices 12, 14, 16, 18, and/or 78 (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

FIGS. 8A-8c illustrate example operations executed by any one or more of the network devices in FIG. 1 in executing geographical tracking of network content and selective containment within geographical boundaries, according to an example embodiment.

The operations described with respect to any of the Figures can be implemented as executable code stored on a computer or machine readable non-transitory tangible storage medium (i.e., one or more physical storage media such as a floppy disk, hard disk, CD-ROM, ROM, EEPROM, nonvolatile RAM, or any other nonvolatile integrated circuit configured to store the executable code) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, or any other nonvolatile integrated circuit configured to execute the executable logic). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

The following example operations can be executed in the secure data network 5 based on the prior description of the network devices in FIGS. 1-7.

Referring to FIG. 8A, the network operating system 20 in a source endpoint device (e.g., "E1") 12 in operation 102 can receive a request to initiate a secure P2P transfer of a network content item 22 to a second network device (e.g., "E2") 12 in the secure data network 5. The network operating system 20 in the source endpoint device in operation 104 can generate a hyperlinked hypercontent object 26 representing the network content item 22 and comprising a root chunk 28 comprising metadata describing the network content item 22 and identifying one or more message objects 24 containing respective data chunks 30 of the network content item 22. The network operating system 20 in the source endpoint device can generate in operation 106 a secure content-oriented packet 34 based on encrypting a root chunk 28 or a message chunk 24 of the hyperlinked hypercontent object 26, and inserting a content tracking ID 50 at a prescribed location in the unencrypted header portion 46. The network operating system 20 in the source endpoint device in operation 108 can cause a geographical tracking of at least the root chunk 28 during the secure P2P transfer of the secure content-oriented packet 34 to the second network device via the secure data network 5 based on the content tracking ID 50.

The network operating system 20 in the source network device in operation 110 can execute containment of the network content item 22 within a prescribed geographical boundary within the secure data network 5 in response to detecting that the network content item 22 is subject to a prescribed policy requiring containment within the prescribed geographical boundary. For example, the network operating system 20 in the source network device in operation 110_A1 can determine whether the second network device is within the prescribed geographical boundary, and the network operating system 20 in operation 110_A2 can block the transfer if detecting that the second network device is outside the prescribed geographical boundary. The network operating system 20 in the source network device in operation 110_A3 also can cause a secure deletion of any portion of the hyperlinked hypercontent object 26 having been received by the second network device if the network operating system 20 in the source network device detects that the second network device has moved from within the prescribed geographical boundary to outside the prescribed geographical boundary.

Hence a user of an endpoint device (e.g., "EP1") 12 can generate and send instructions for deployment of geospatial boundary enforcement in the secure data network 5 in operation 110 resulting in containment of a network content item 22, including causing a network device 12, 14, 16, and/or 18 in operation 110_A2 to execute blocking transfer and/or halting transmission of a secure content-oriented packet 34 to a moving network device 12, 14, or 16 determined as having moved from inside the secure data network 5 to outside the secure data network 5; or causing in operation 110_A3 a moving network device 12, 14, or 16 determined as having moved from inside the secure data network 5 to outside the secure data network 5 and received an identified secure content-oriented packet 34 to execute autonomic cryptographic secure deletion of the identified secure content-oriented packet 34.

Referring to FIG. 8B, a user of an endpoint device (e.g., "EP1") 12 can generate in operation 112 an executable instruction for establishing a virtualized sensor group 62 containing one or more virtual sensors 64, where each virtual sensor 64 can include instructions for a sentinel agent 40 executed in a detecting network device and executing the virtual sensor 64 to record a geospatial sensor recording 76 associated with transfer of a secure content-oriented packet 34 via the secure data network 5. The sentinel agent 40 in the endpoint device (e.g., "EP1" can securely send in operation 114 the executable instruction to the centralized MCP device 14 for deployment by one or more detecting network devices 12, 14, and/or 16 in a path between a source network device (e.g., "EP1") 12 and a destination network device (e.g., "EP2") 12. Each network device in the path executing the virtual sensor 64 in operation 116 can securely send the corresponding geospatial sensor recording 76 to the GTS database device 18.

A user of an endpoint device (e.g., "EP1") 12 also can generate in operation 118 a geospatial tracking query requesting the geographical tracking of a secure content-oriented packet 34, and send in operation 118 the geospatial tracking query to the centralized GTS database device 18, and in response receive a geospatial tracking result in the form of a notification 80 or a content flow visualization 82 as described above indicating whether the secure content-oriented packet 34 was contained within a prescribed geographical boundary.

Hence, a destination endpoint device (e.g., "EP1" or "EP2") 12 in operation 120 can execute a virtual sensor 64 and detect a geospatial event "GE1" of the destination endpoint device at a first geographic location G1 at a corresponding first detected time T1 (e.g., GE1(G1, T1)) (e.g., within a prescribed geographical boundary), and in response receive an encrypted root chunk in a received secure content-oriented packet 34. In response to the virtual sensor 64 in the destination endpoint device in operation 122 detecting a second geospatial event "GE2" of the destination endpoint device at a second geographic location G2 at a corresponding first second time T2 (e.g., GE2(G2, T2)) (e.g., outside a prescribed geographical boundary), the sentinel agent 40 of the network operating system 20 executed in the destination endpoint device can either halt reception of (or cryptographically erase) any data chunks 24 that are identified in the root chunk from the received secure content-oriented packet 34.

Referring to FIG. 8C, a network operating system (NOS) 20 executed in a replicator device (e.g., "R1" to "R100") 16 in operation 124 can receive instructions for executing one or more virtual sensors 64. The replicator device 16 in operation 126 can receive a secure content-oriented packet 34 from a cohort second network device and detect a bitstring at a prescribed location in the unencrypted header portion 46 indicating a content tracking ID 50, and in response one or more virtual sensors 64 in the replicator device 16 in operation 128 can selectively record a geospatial sensor recording 76 associated with reception of the secure content-oriented packet 34 at an identified geographic location at a corresponding detected time.

The network operating system 20 executed in the replicator device 16 in operation 130 also can selectively enforce a containment of the secure content-oriented packet 34 within a prescribed geographical boundary in response to detecting the content tracking ID 50, and based on an instruction indicating the secure content-oriented packet 34 is to be confined within the prescribed geographical boundary, for example based solely on the content tracking ID 50, or also based on any one or more of the source endpoint ID, the destination endpoint ID, a specified priority, a flow ID, etc. as specified in the instruction. For example, the replicator device (e.g., "R1") in operation 132 can determine a current geographic location of a next cohort device (e.g., the replicator device "R100" 16 or another endpoint device (not shown) connected to the replicator device "R1"), for example based on sending a query to the GTS database device 18, and in response securely send in operation 132_A1 the secure content-oriented packet 34 based on determining the next cohort device is within the prescribed geographical boundary, or blocking in operation 132_A2 the sending of the secure content-oriented packet 34 in response to determining the next cohort device is not within the prescribed geographical boundary.

A virtual sensor 64 executed in the replicator device 16 can send in operation 134 a geospatial sensor recording 76 to the GTS database device 18 indicating whether the secure content-oriented packet 34 was securely sent to the next cohort device or blocked by the replicator device 16.

In case the network operating system 20 executed in the replicator device 16 detects in operation 136 that the prescribed field in the unencrypted header portion 46 of the secure content-oriented packet 34 indicates a null value indicating no content tracking ID 50, no virtual sensor 64 in the replicator device 16 executes any recording of a geospatial sensor recording 76 and thus the network operating system 20 forwards the secure content-oriented packet 34 without enforcing the containment to a prescribed geographical boundary.

According to example embodiments, network devices in a secure peer-to-peer data network can provide full geographical content traceability of a network content item that is inserted into and propagated through a secure data network. A hyperlinked hypercontent object representing the network content item is generated that includes a root chunk describing the network content item, and one or more message chunks containing respective data chunks from the network content item. The hyperlinked hypercontent object also comprises a list that references each of the message chunks. A content tracking identifier is inserted at a prescribed position of an unencrypted header portion for a secure content-oriented packet carrying an encrypted version of the root chunk, enabling any network device in the secure data network to detect the content tracking identifier in at least the secure content-oriented packet carrying an encrypted version of the root chunk. Virtual sensors can be deployed in the secure data network, enabling distributed geospatial tracking of at least the secure content-oriented packet carrying an encrypted version of the root chunk and the content tracking identifier at the prescribed position of the unencrypted header portion. Selective containment of the network content item also can be executed based on confining at least the root chunk (and optionally the data chunks), within a prescribed geographic boundary in the secure data network.

Hence, the example embodiments can provide enhanced network security, geospatial traceability, and enforcement within defined boundaries of network content within a secure data network.

The example embodiments also can be applied to existing wide area network deployments requiring enhanced geospatial traceability and geographical boundary enforcement, for example distributed computing services (e.g., SaaS) that may deploy multiple computing devices in multiple countries; in such a case, the distributed computing services can be implemented as a single customer domain within the secure data network, and each computing device deployed among data centers across multiple countries can be implemented as an endpoint device executing the network operating system as described herein, such that distributed computing services and sensitive network content can be traced and confined within corporate and/or geographical boundaries, as required.

While the example embodiments in this disclosure have been described in connection with what is currently considered to be the best mode for carrying out the subject matter specified in the appended claims, it is to be understood that the example embodiments are only illustrative, and that various changes may be made without restricting or departing from the subject matter specified in the appended claims.

What is claimed is:

1. A method comprising:

receiving, by a secure executable container executed by a network device, a request to initiate a secure peer-to-peer transfer of a network content item to at least a second network device in a secure data network, the second network device a cohort having established a two-way trusted relationship with the network device;

generating, by the secure executable container, a root data object containing metadata describing the network content item and comprising a list identifying one or more message objects containing respective data chunks of the network content item, the root data object and the data chunks constituting a hyperlinked hypercontent object representing the network content item;

generating, by the secure executable container, a secure data packet based on encrypting the root data object or one of the data chunks of the data object, the secure data packet of the root data object including a content tracking identifier at a prescribed location in an unencrypted header portion; and causing, by the secure executable container based on the content tracking identifier, a geographical tracking of at least the root data object during the secure peer-to-peer transfer of the secure data packet to the second network device via the secure data network.

2. The method of claim 1, further comprising:

executing, by the secure executable container, containment of the network content item within a prescribed geographical boundary within the secure data network in response to detecting that the network content item is subject to a prescribed policy requiring containment within the prescribed geographical boundary;

the executing containment including determining whether the second network device is within the prescribed geographical boundary.

3. The method of claim 2, wherein the executing containment includes blocking the secure peer-to-peer transfer of the secure data packet to the second network device in response to detecting the second network device is outside the prescribed geographical boundary.

4. The method of claim 2, wherein the executing containment includes causing secure deletion of any portion of the hyperlinked hypercontent object having been received by the second network device in response to detecting the second network device has moved from within the prescribed geographical boundary to outside the prescribed geographical boundary.

5. The method of claim 1, wherein the causing includes:
generating an executable instruction for establishing a virtualized sensor group containing one or more executable virtual sensors, each virtual sensor includes instructions causing a detecting network device executing the virtual sensor to record a sensor recording that specifies a geospatial event associated with transfer of the secure data packet via the secure data network; and
securely sending the executable instruction to a centralized management entity for deployment by one or more of the detecting network devices in a path between the network device and the second network device.

6. The method of claim 5, wherein the securely sending includes causing the second network device executing one or more of the virtual sensors to send the corresponding sensor recording to a centralized geospatial time sequence database in the secure data network.

7. The method of claim 1, wherein the causing includes generating an executable instruction that causes one or more detecting network devices in a path between the network device and the second network device to notify a centralized geospatial time sequence database in the secure data network of a geospatial event in response to a corresponding transfer of the secure data packet toward the second network device.

8. The method of claim 1, further comprising:
generating, by the executable container, a geospatial tracking query requesting the geographical tracking of the secure data packet;
sending, by the executable container, the geospatial tracking query to a centralized geospatial time sequence database having accumulated sensor recordings of geospatial events associated with the geographical tracking of the secure data packet; and
receiving, by the executable container, a geospatial tracking result indicating geographical tracking of the secure data packet, including an identification of whether the secure data packet has been contained within a prescribed geographical boundary within the secure data network.

9. The method of claim 1, further comprising:
executing, by a virtual sensor in the secure executable container, a detection of a geospatial event of the network device at a first identified geographic location at a corresponding first detected time;
receiving, by the secure executable container via the secure data network, a second root data object of a second hyperlinked hypercontent object;
detecting, by the virtual sensor after reception of the second root data object, a second geospatial event of the network device at a second identified geographic location at a corresponding second detected time, the second identified geographic location different than the first identified geographic location; and
halting reception of or cryptographically erasing, by the secure executable container in response to the second geospatial event, any data chunks identified in the second root data object as associated with the second hyperlinked hypercontent object.

10. One or more non-transitory tangible media encoded with logic for execution by a machine and when executed by the machine operable for:
receiving, by the or more non-transitory tangible media executed by the machine implemented as a network device, a request to initiate a secure peer-to-peer transfer of a network content item to at least a second network device in a secure data network, the one or more non-transitory tangible media implemented as a secure executable container;
generating, by the secure executable container, a root data object containing metadata describing the network content item and comprising a list identifying one or more message objects containing respective data chunks of the network content item, the root data object and the data chunks constituting a hyperlinked hypercontent object representing the network content item;
generating, by the secure executable container, a secure data packet based on encrypting the root data object or one of the data chunks of the data object, the secure data packet of the root data object including a content tracking identifier at a prescribed location in an unencrypted header portion; and
causing, by the secure executable container based on the content tracking identifier, a geographical tracking of at least the root data object during the secure peer-to-peer transfer of the secure data packet to the second network device via the secure data network.

11. The one or more non-transitory tangible media of claim 10, further operable for:
executing, by the secure executable container, containment of the network content item within a prescribed geographical boundary within the secure data network in response to detecting that the network content item is subject to a prescribed policy requiring containment within the prescribed geographical boundary;
the executing containment including determining whether the second network device is within the prescribed geographical boundary.

12. The one or more non-transitory tangible media of claim 10, further operable for:
generating, by the executable container, a geospatial tracking query requesting the geographical tracking of the secure data packet;
sending, by the executable container, the geospatial tracking query destined for a centralized geospatial time sequence database having accumulated sensor recordings of geospatial events associated with the geographical tracking of the secure data packet; and
receiving, by the executable container, a geospatial tracking result indicating geographical tracking of the secure data packet, including an identification of whether the secure data packet has been contained within a prescribed geographical boundary within the secure data network.

13. A method comprising:
receiving, by a secure executable container executed by a replicator device in a secure data network, an instruction to execute one or more virtual sensors of a virtualized sensor group;
receiving, by the secure executable container, a secure data packet from a second network device, the second network device a cohort having established a two-way trusted relationship with the replicator device in the secure data network;

detecting, by the secure executable container, a bitstring at a prescribed location in an unencrypted header portion of the secure data packet;

selectively recording, by the one or more virtual sensors executed by the replicator device in response to the instruction and detection of the bitstring as indicating a content tracking identifier, a sensor recording that specifies a geospatial event associated with reception of the secure data packet at an identified geographic location of the replicator device at a corresponding first detected time; and selectively enforcing, by the secure executable container in response to detection of the bitstring as indicating the content tracking identifier, a containment of the secure data packet within a prescribed geographical boundary based on a received instruction indicating the secure data packet associated with the content tracking identifier is to be confined within the prescribed geographical boundary.

14. The method of claim 13, further comprising:

determining, by the secure executable container, a current geographic location of a next cohort network device in a path toward a destination device identified in the secure data packet;

wherein the selectively enforcing includes one of:

determining the current geographic location of the next cohort network device is within the prescribed geographical boundary and in response securely sending the secure data packet to the next cohort network device; or determining the current geographic location of the next cohort network device is not within the prescribed geographical boundary and in response blocking any sending the secure data packet to the next cohort network device.

15. The method of claim 14, wherein:

the determining the current geographic location of the next cohort network device includes obtaining the current geographic location from a centralized geospatial time sequence database in the secure data network;

the selectively enforcing comprising:

a virtual sensor executed in the replicator device recording a sensor recording indicating one of the secure data packet was sent to the next cohort network device, or a sending of the secure data packet to the next cohort network device was blocked; and the secure executable container securely sending the sensor recording to the centralized geospatial time sequence database.

16. The method of claim 13, further comprising securely sending the sensor recording to a centralized geospatial time sequence database in the secure data network, enabling geographical tracking of the secure data packet during secure peer-to-peer transfer of the secure data packet via the secure data network toward a destination device identified in the secure data packet.

17. The method of claim 13, further comprising:

detecting the bitstring indicates a null value indicating no content tracking identifier;

the selectively recording including not recording the sensor recording in response to detecting the null value in the secure data packet;

the selectively enforcing including forwarding the secure data packet, without enforcing the containment in response to detecting the null value in the secure data packet.

18. One or more non-transitory tangible media encoded with logic for execution by a machine and when executed by the machine operable for:

receiving, by the or more non-transitory tangible media executed by the machine implemented as a replicator device in a secure data network, an instruction to execute one or more virtual sensors of a virtualized sensor group, the one or more non-transitory tangible media implemented as a secure executable container;

receiving, by the secure executable container, a secure data packet from a second network device, the second network device a cohort having established a two-way trusted relationship with the replicator device in the secure data network;

detecting, by the secure executable container, a bitstring at a prescribed location in an unencrypted header portion of the secure data packet;

selectively recording, by the one or more virtual sensors executed by the replicator device in response to the instruction and detection of the bitstring as indicating a content tracking identifier, a sensor recording that specifies a geospatial event associated with reception of the secure data packet at an identified geographic location of the replicator device at a corresponding first detected time; and selectively enforcing, by the secure executable container in response to detection of the bitstring as indicating the content tracking identifier, a containment of the secure data packet within a prescribed geographical boundary based on a received instruction indicating the secure data packet associated with the content tracking identifier is to be confined within the prescribed geographical boundary.

19. The one or more non-transitory tangible media of claim 18, further operable for:

determining, by the secure executable container, a current geographic location of a next cohort network device in a path toward a destination device identified in the secure data packet;

wherein the selectively enforcing includes one of:

determining the current geographic location of the next cohort network device is within the prescribed geographical boundary and in response securely sending the secure data packet to the next cohort network device; or determining the current geographic location of the next cohort network device is not within the prescribed geographical boundary and in response blocking any sending the secure data packet to the next cohort network device.

20. The one or more non-transitory tangible media of claim 18, further operable for:

securely sending the sensor recording to a centralized geospatial time sequence database in the secure data network, enabling geographical tracking of the secure data packet during secure peer-to-peer transfer of the secure data packet via the secure data network toward a destination device identified in the secure data packet.

21. An apparatus implemented as a physical machine, the apparatus comprising:

non-transitory machine readable media configured for storing executable machine readable code implemented as a secure executable container;

a device interface circuit; and a processor circuit configured for executing the machine readable code as a network device, and when executing the machine readable code operable for:

receiving a request to initiate a secure peer-to-peer transfer of a network content item to at least a second network device in a secure data network, the second network device a cohort having established a two-way trusted relationship with the network device;

generating a root data object containing metadata describing the network content item and comprising a list identifying one or more message objects containing respective data chunks of the network content item, the root data object and the data chunks constituting a hyperlinked hypercontent object representing the network content item;

generating a secure data packet based on encrypting the root data object or one of the data chunks of the data object, the secure data packet of the root data object including a content tracking identifier at a prescribed location in an unencrypted header portion;

causing, based on the content tracking identifier, a geographical tracking of at least the root data object during the secure peer-to-peer transfer of the secure data packet to the second network device via the secure data network.

22. An apparatus implemented as a physical machine, the apparatus comprising:

non-transitory machine readable media configured for storing executable machine readable code implemented as a secure executable container;

a device interface circuit; and a processor circuit configured for executing the machine readable code as a replicator device in a secure data network, and when executing the machine readable code operable for:

receiving an instruction to execute one or more virtual sensors of a virtualized sensor group;

receiving a secure data packet from a second network device, the second network device a cohort having established a two-way trusted relationship with the replicator device in the secure data network;

detecting a bitstring at a prescribed location in an unencrypted header portion of the secure data packet;

selectively recording, by the one or more virtual sensors executed by the replicator device in response to the instruction and detection of the bitstring as indicating a content tracking identifier, a sensor recording that specifies a geospatial event associated with reception of the secure data packet at an identified geographic location of the replicator device at a corresponding first detected time; and selectively enforcing, in response to detection of the bitstring as indicating the content tracking identifier, a containment of the secure data packet within a prescribed geographical boundary based on a received instruction indicating the secure data packet associated with the content tracking identifier is to be confined within the prescribed geographical boundary.

* * * * *